United States Patent
Nakamura et al.

(10) Patent No.: US 8,780,029 B2
(45) Date of Patent: Jul. 15, 2014

(54) SIGNAL CONVERSION CIRCUIT, AND MULTIPLE-PRIMARY-COLOR LIQUID CRYSTAL DISPLAY DEVICE PROVIDED WITH SAME

(75) Inventors: Kozo Nakamura, Osaka (JP); Shun Ueki, Osaka (JP); Kazunari Tomizawa, Osaka (JP); Tomohiko Mori, Osaka (JP); Yuichi Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 239 days.

(21) Appl. No.: 13/119,978

(22) PCT Filed: Sep. 18, 2009

(86) PCT No.: PCT/JP2009/004764
§ 371 (c)(1),
(2), (4) Date: Mar. 21, 2011

(87) PCT Pub. No.: WO2010/032488
PCT Pub. Date: Mar. 25, 2010

(65) Prior Publication Data
US 2011/0210911 A1 Sep. 1, 2011

(30) Foreign Application Priority Data

Sep. 22, 2008 (JP) ................. 2008-242515

(51) Int. Cl.
| | | |
|---|---|---|
| G09G 3/36 | (2006.01) | |
| G06F 3/038 | (2013.01) | |
| G09G 5/00 | (2006.01) | |
| G09G 5/10 | (2006.01) | |
| G09G 5/02 | (2006.01) | |

(52) U.S. Cl.
USPC ............. 345/89; 345/87; 345/88; 345/204; 345/690; 345/694

(58) Field of Classification Search
USPC ............. 345/204, 690, 694, 87–89, 94
See application file for complete search history.

(56) References Cited

U.S. PATENT DOCUMENTS

| | | | |
|---|---|---|---|
| 4,800,375 A | 1/1989 | Silverstein et al. | |
| 6,661,488 B1 | 12/2003 | Takeda et al. | |

(Continued)

FOREIGN PATENT DOCUMENTS

| | | |
|---|---|---|
| JP | 09-251160 A | 9/1997 |
| JP | 11-242225 A | 9/1999 |

(Continued)

OTHER PUBLICATIONS

English translation of Official Communication issued in corresponding International Application PCT/JP2009/004764, mailed on Apr. 28, 2011.

(Continued)

Primary Examiner — Ilana Spar
(74) Attorney, Agent, or Firm — Keating & Bennett, LLP

(57) ABSTRACT

A multiprimary liquid crystal display device in which deteriorations in display quality caused by the coloration of a gray representation when viewed from an oblique direction are suppressed, and a signal conversion circuit for use in such a multiprimary liquid crystal display device are provided.

A signal conversion circuit according to the present invention is for use in a multiprimary liquid crystal display device, the multiprimary liquid crystal display device having a pixel defined by a plurality of subpixels including a red subpixel, a green subpixel, a blue subpixel, and a yellow subpixel, and performing multicolor display by using four or more primary colors to be displayed by the plurality of subpixels, the signal conversion circuit converting an input video signal to a multiprimary signal corresponding to four or more primary colors. When a video signal for the pixel to display a gray color having a normalized luminance of no less than 0.2 and no more than 0.3 is input, the signal conversion circuit according to the present invention performs a conversion of the video signal so that, among the normalized luminances of the plurality of subpixels, the yellow subpixel has the lowest normalized luminance.

14 Claims, 17 Drawing Sheets

(56) References Cited

U.S. PATENT DOCUMENTS

| | | |
|---|---|---|
| 6,958,791 B2 | 10/2005 | Shimoshikiryo |
| 7,034,789 B2 | 4/2006 | Takeuchi et al. |
| 7,145,624 B2 | 12/2006 | Kubo et al. |
| 7,643,094 B2 * | 1/2010 | Kawashima et al. ......... 348/655 |
| 8,212,753 B2 * | 7/2012 | Tomizawa ....................... 345/88 |
| 8,451,391 B2 * | 5/2013 | Ueki et al. ...................... 349/33 |
| 2004/0174389 A1 | 9/2004 | Ben-David et al. |
| 2005/0122294 A1 | 6/2005 | Ben-David et al. |
| 2005/0264587 A1 | 12/2005 | Kurumisawa |
| 2006/0038953 A1 * | 2/2006 | Moriya ......................... 349/144 |
| 2008/0101692 A1 | 5/2008 | Tanase et al. |
| 2009/0153454 A1 | 6/2009 | Irie et al. |
| 2009/0167657 A1 | 7/2009 | Tomizawa |
| 2010/0053235 A1 | 3/2010 | Tomizawa et al. |

FOREIGN PATENT DOCUMENTS

| | | |
|---|---|---|
| JP | 2001-209047 A | 8/2001 |
| JP | 2001-306023 A | 11/2001 |
| JP | 2003-043525 A | 2/2003 |
| JP | 2004-062146 A | 2/2004 |
| JP | 2004-078157 A | 3/2004 |
| JP | 2004-529396 A | 9/2004 |
| JP | 2005-062833 A | 9/2005 |
| JP | 2006-276797 A | 10/2006 |
| JP | 2008-065175 A | 3/2008 |
| JP | 2008-083439 A | 4/2008 |
| JP | 2008-107507 A | 5/2008 |
| WO | 02/101644 A2 | 12/2002 |
| WO | 2007/052381 A1 | 5/2007 |
| WO | 2007/097080 A1 | 8/2007 |

OTHER PUBLICATIONS

Official Communication issued in International Patent Application No. PCT/JP2009/004764, mailed on Dec. 28, 2009.

Pointer; "The Gamut of Real Surface Colours"; Color Research and Application; vol. 5; No. 3; Fall 1980; pp. 145-155.

Yang et al.; "31.1: Development of Six Primary-Color LCD"; Society for Information Display, 2005 International Symposium Digest of Technical Papers; vol. XXXVI; Book II; May 25-27, 2005; pp. 1210-1213.

Chino et al.; "25.1: Invited Paper: Development of Wide-Color-Gamut Mobile Displays With Four-Primary-Color LCDS"; Society for Information Display, 2006 International Symposium Digest of Technical Papers; vol. XXXVII, Book II; Jun. 7-9, 2006; pp. 1221-1224.

Ben-Chorin; "Improving LCD TV Color Using Multi-Primary Technology"; FPD International 2005 Forum; Oct. 19, 2005; 66 pages.

Tomizawa et al., "Signal Conversion Circuit and Multiple Primary Color Liquid Crystal Display Device With the Circuit," U.S. Appl. No. 12/312,747, filed May 26, 2009.

Tomizawa et al., "Signal Conversion Circuit, and Multiple Primary Color Liquid Crystal Display Device Having the Circuit," U.S. Appl. No. 12/993,906, filed Nov. 22, 2010.

* cited by examiner

PIXEL

R G B Ye (a)

(b)

(c)

SIGNAL CONVERSION CIRCUIT, AND MULTIPLE-PRIMARY-COLOR LIQUID CRYSTAL DISPLAY DEVICE PROVIDED WITH SAME

TECHNICAL FIELD

The present invention relates to a liquid crystal display device, and more particularly to a multiprimary liquid crystal display device which performs display by using four or more primary colors. The present invention also relates to a signal conversion circuit for use in such a liquid crystal display device.

BACKGROUND ART

Currently, various display devices are used in a variety of applications, including liquid crystal display devices. In commonly-used display devices, each pixel is composed of three subpixels for displaying three primaries of light, i.e., red, green and blue, whereby multicolor display is achieved.

However, conventional display devices have a problem in that they can only display colors in a narrow range (referred to as a "color gamut"). FIG. 40 shows a color gamut of a conventional display device which performs display by using three primaries. FIG. 40 is an xy chromaticity diagram in an XYZ color system, where a color gamut is shown by a triangle whose apices are at three points corresponding to the three primaries of red, green and blue. Also shown in the figure are plotted colors (represented by "x" symbols) of various objects existing in nature, as taught by Pointer (see Non-Patent Document 1). As can be seen from FIG. 40, there are some object colors which do not fall within the color gamut. Thus, display devices which perform display by using three primaries are unable to display some object colors.

Therefore, in order to broaden the color gamut of a display device, there has been proposed a technique which increases the number of primary colors to be used for displaying to four or more.

For example, as shown in FIG. 41, Patent Document 1 discloses a liquid crystal display device 800 each of whose pixels P is composed of six subpixels R, G, B, Ye, C and M for displaying red, green, blue, yellow, cyan, and magenta. The color gamut of the liquid crystal display device 800 is shown in FIG. 42. As shown in FIG. 42, a color gamut which is represented as a hexagonal shape whose apices are at six points corresponding to the six primary colors essentially encompasses all object colors. Thus, the color gamut can be broadened by increasing the number of primary colors to be used for displaying. In the present specification, display devices which perform display by using four or more primary colors will be collectively referred to as "multiprimary display devices", and liquid crystal display devices which perform display by using four or more primary colors will be referred to as "multiprimary liquid crystal display devices (or simply, multiprimary LCDs)". Moreover, conventional commonly-used display devices which perform display by using three primaries will be collectively referred to as "three-primary display devices", and liquid crystal display devices which perform display by using three primaries will be referred to as "three-primary liquid crystal display devices (or simply, three-primary LCDs)".

Liquid crystal display devices of the TN (Twisted Nematic) mode and the STN (Super Twisted Nematic) mode, which have conventionally been used commonly, have a disadvantage of narrow viewing angles, and various display modes have been developed for improving this.

As display modes with improved viewing angle characteristics, an MVA (Multi-domain Vertical Alignment) mode disclosed in Patent Document 2, a CPA (Continuous Pinwheel Alignment) mode disclosed in Patent Document 3, and the like are known.

The MVA mode and the CPA mode realize displaying with a high quality and a wide viewing angle. However, as a problem regarding viewing angle characteristics, a problem has newly emerged for wide-viewing-angle vertical alignment modes (VA modes) such as the MVA mode and the CPA mode; that is, the $\gamma$ characteristics when observed from the front may differ from the $\gamma$ characteristics when observed obliquely, i.e., a viewing angle dependence problem of the $\gamma$ characteristics. The $\gamma$ characteristics are the gray scale dependence of display luminance. If the $\gamma$ characteristics differ between the frontal direction and oblique directions, the state of gray scale displaying will differ depending on the direction of observation, which would be especially problematic when displaying images such as photographs and when displaying TV broadcasts or the like.

A viewing angle dependence of the $\gamma$ characteristics in the vertical alignment mode is visually perceived as a phenomenon where an obliquely observation results in a display luminance which is increased over the original display luminance (called "whitening"). If whitening occurs, another problem occurs in that a color which is displayed by a pixel differs between when viewed from the frontal direction and when viewed from an oblique direction.

As techniques of reducing the viewing angle dependence of the $\gamma$ characteristics, a technique called multi-pixel driving has been proposed in Patent Document 4 and Patent Document 5. In this technique, one subpixel is divided into two regions, and different voltages are applied to the respective regions, thereby reducing the viewing angle dependence of the $\gamma$ characteristics.

CITATION LIST

Patent Literature

[Patent Document 1] Japanese National Phase PCT Laid-Open Publication No. 2004-529396
[Patent Document 2] Japanese Laid-Open Patent Publication No. 11-242225
[Patent Document 3] Japanese Laid-Open Patent Publication No. 2003-43525
[Patent Document 4] Japanese Laid-Open Patent Publication No. 2004-62146
[Patent Document 5] Japanese Laid-Open Patent Publication No. 2004-78157

Non-Patent Literature

[Non-Patent Document 1] M. R. Pointer, "The gamut of real surface colors," Color Research and Application, Vol. 5, No. 3, pp. 145-155 (1980)

SUMMARY OF INVENTION

Technical Problem

However, studies of the inventors have revealed that, in the case where multi-pixel driving is employed, a gray representation of a low gray scale level (i.e., low luminance) may become yellowish when the gray representation is viewed from an oblique direction. This phenomenon of coloration also occurs when multi-pixel driving is applied to a multiprimary LCD, thus deteriorating the display quality.

The present invention has been made in view of the above problems, and an objective thereof is to provide a multiprimary liquid crystal display device in which deteriorations in display quality caused by the coloration of a gray representation when viewed from an oblique direction are suppressed, as well as to provide a signal conversion circuit for use in such a multiprimary liquid crystal display device.

Solution to Problem

A signal conversion circuit according to the present invention is a signal conversion circuit for use in a multiprimary liquid crystal display device, the multiprimary liquid crystal display device having a pixel defined by a plurality of subpixels including a red subpixel, a green subpixel, a blue subpixel, and a yellow subpixel, and performing multicolor display by using four or more primary colors to be displayed by the plurality of subpixels, the signal conversion circuit converting an input video signal to a multiprimary signal corresponding to four or more primary colors, wherein, when a video signal for the pixel to display a gray color having a normalized luminance of no less than 0.2 and no more than 0.3 is input, the signal conversion circuit converts the video signal so that, among normalized luminances of the plurality of subpixels, the yellow subpixel has the lowest normalized luminance.

In a preferred embodiment, when a video signal for the pixel to display a gray color having a normalized luminance of no less than 0.15 and no more than 0.35 is input, the signal conversion circuit according to the present invention performs a conversion of the video signal so that, among the normalized luminances of the plurality of subpixels, the yellow subpixel has the lowest normalized luminance.

In a preferred embodiment, when a video signal for the pixel to display a gray color having a normalized luminance of no less than 0.2 and no more than 0.3 is input, the signal conversion circuit according to the present invention performs a conversion of the video signal so that, among the normalized luminances of the plurality of subpixels, the normalized luminance of the blue subpixel is the lowest next to the normalized luminance of the yellow subpixel.

In a preferred embodiment, the plurality of subpixels further includes a cyan subpixel.

In a preferred embodiment, when a video signal for the pixel to display a gray color having a normalized luminance of no less than 0.2 and no more than 0.3 is input, the signal conversion circuit according to the present invention performs a conversion of the video signal so that, among the normalized luminances of the plurality of subpixels, the normalized luminance of the green subpixel is the highest.

In a preferred embodiment, when a video signal for the pixel to display a gray color having a normalized luminance of no less than 0.2 and no more than 0.3 is input, the signal conversion circuit according to the present invention performs a conversion of the video signal so that, among the normalized luminances of the plurality of subpixels, the normalized luminance of the red subpixel is the highest.

In a preferred embodiment, when a video signal for the pixel to display a gray color having a normalized luminance of no less than 0.2 and no more than 0.3 is input, the signal conversion circuit according to the present invention performs a conversion of the video signal so that, among the normalized luminances of the plurality of subpixels, the normalized luminance of the cyan subpixel is the highest.

In a preferred embodiment, the signal conversion circuit according to the present invention performs a conversion of the video signal so that the normalized luminance of each of the plurality of subpixels monotonously increases with increase in the normalized luminance of the gray color displayed by the pixel.

In a preferred embodiment, the signal conversion circuit according to the present invention performs a conversion of the video signal so that the normalized luminance of at least one of the plurality of subpixels does not monotonously increase with increase in the normalized luminance of the gray color displayed by the pixel.

In a preferred embodiment, given a number n of primary colors used for displaying, the signal conversion circuit according to the present invention obtains luminances of (n−3) primary colors among the n primary colors by referring to a look-up table based on the input video signal, and through a calculation using the luminances of the (n−3) primary colors, calculates the luminances of the other three primary colors among the n primary colors.

In a preferred embodiment, the signal conversion circuit according to the present invention comprises: a look-up table memory for storing the look-up table; and a calculation section for performing the calculation.

A multiprimary liquid crystal display device according to the present invention comprises a signal conversion circuit of the above construction and a liquid crystal display panel to which a multiprimary signal generated by the signal conversion circuit is input.

In a preferred embodiment, the liquid crystal display panel includes a first substrate, a second substrate opposing the first substrate, and a vertical-alignment type liquid crystal layer provided between the first substrate and the second substrate, and has the plurality of subpixels; and in each of the plurality of subpixels, when a predetermined voltage is applied across the liquid crystal layer, liquid crystal molecules contained in the liquid crystal layer are tilted in a plurality of azimuth directions.

In a preferred embodiment, each of the plurality of subpixels has a plurality of regions capable of applying different voltages across the liquid crystal layer therein.

Advantageous Effects of Invention

According to the present invention, there is provided a multiprimary liquid crystal display device in which deteriorations in display quality caused by the coloration of a gray representation when viewed from an oblique direction are suppressed. According to the present invention, there is also provided a signal conversion circuit for use in such a multiprimary liquid crystal display device.

DESCRIPTION OF EMBODIMENTS

As the formats of a video signal to be input to a three-primary display device, the RGB format, the YCrCb format, and the like are commonly used. A video signal of these formats contains three parameters (thus being a three-dimensional signal, as it were), thus allowing the luminances of the three primaries (red, green, and blue) used for displaying to be uniquely determined.

In order to perform display with a multiprimary display device, it is necessary to convert a video signal of a format for three-primary display devices to a video signal containing more parameters (four or more parameters). Such a video signal corresponding to four or more primary colors will be referred to as a "multiprimary signal" in the present specification.

In the case where colors which are presented by a video signal of a format for three-primary display devices is to be expressed by using four or more primary colors, the luminance of each primary color will not be uniquely determined, and there will be a multitude of luminance combinations. In other words, the method of converting a three-dimensional signal to a multiprimary signal is not just one.

The inventors have conducted various studies concerning signal conversion techniques to be used for multiprimary LCDs, and found a signal conversion technique which can suppress coloration of a gray representation when viewed from an oblique direction.

Hereinafter, an embodiment of the present invention will be described with reference to the drawings. Note that the present invention is not limited to the following embodiment.

Figure 1:
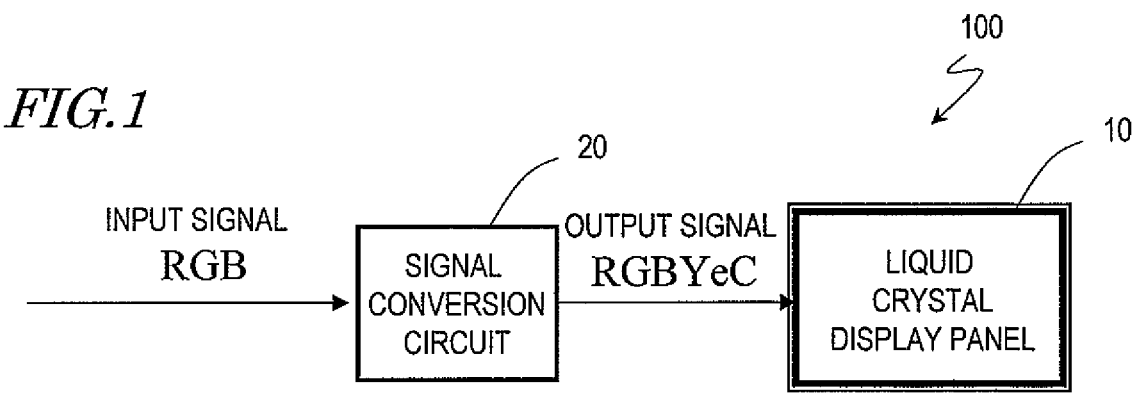
FIG. 1 A block diagram schematically showing a liquid crystal display device 100 according to a preferred embodiment of the present invention.

FIG. 1 shows a liquid crystal display device 100 according to the present embodiment. As shown in FIG. 1, the liquid crystal display device 100 is a multiprimary LCD which includes a liquid crystal display panel 10 and a signal conversion circuit 20, and performs multicolor display by using four or more primary colors.

Figure 2:
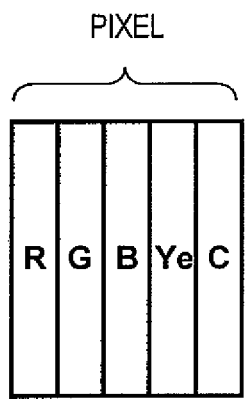
FIG. 2 A diagram showing an exemplary pixel construction of the liquid crystal display device 100.

The liquid crystal display device 100 includes a plurality of pixels which are arranged in a matrix array, each pixel being defined by a plurality of subpixels. FIG. 2 shows an exemplary pixel construction of the liquid crystal display device 100. In the example shown in FIG. 2, the plurality of subpixels defining each pixel are a red subpixel R for displaying red, a green subpixel G for displaying green, a blue subpixel B for displaying blue, a yellow subpixel Ye for displaying yellow, and a cyan subpixel C for displaying cyan. Table 1 represents the chromaticity xy and relative luminance Y of each primary color that is displayed by the red subpixel R, the green subpixel G, the blue subpixel B, the yellow subpixel Ye, and the cyan subpixel C (where the values are based on the luminance of white, defined as 100, that is displayed by the pixel).

TABLE 1

|    | x     | y     | Y    |
|----|-------|-------|------|
| R  | 0.683 | 0.312 | 18.6 |
| G  | 0.239 | 0.631 | 22.7 |
| B  | 0.144 | 0.055 | 6.6  |
| Ye | 0.478 | 0.512 | 42.0 |
| C  | 0.129 | 0.340 | 10.0 |

Note that the types, number, and arrangement of subpixels defining one pixel are not limited to those illustrated in FIG. 2. It suffices if the plurality of subpixels defining one pixel at least include the red subpixel R, the green subpixel G, the blue subpixel B, and the yellow subpixel Ye.

The signal conversion circuit 20 converts an input video signal to a multiprimary signal corresponding to four or more primary colors. As shown in FIG. 1, for example, the signal conversion circuit 20 converts a video signal (three-dimensional signal) of the RGB format, containing components indicating respective luminances of red, green, and blue into a multiprimary signal containing components indicating respective luminances red, green, blue, yellow, and cyan.

A multiprimary signal which is generated by the signal conversion circuit 20 is input to the liquid crystal display panel 10, whereby a color which is in accordance with the input multiprimary signal is displayed by each pixel. As the display mode of the liquid crystal display panel 10, vertical alignment modes (VA modes) can be suitably used, which can realize wide viewing angle characteristics; for example, the MVA mode and the CPA mode can be used. As will be described in detail later, a panel of the MVA mode or the CPA mode includes a vertical-alignment type liquid crystal layer, in which liquid crystal molecules are aligned perpendicularly to the substrates in the absence of an applied voltage, and realizes displaying with a wide viewing angle because the liquid crystal molecules are tilted in a plurality of azimuth directions within each subpixel under an applied voltage.

Moreover, each subpixel of the liquid crystal display device 100 has a plurality of regions, each of which is capable of applying a different voltage across the liquid crystal layer therein. In other words, each subpixel is split into a plurality (e.g., two or three) of regions to which voltages can be independently applied, and thus the liquid crystal display device 100 has a construction which enables multi-pixel driving as disclosed in Patent Document 4 and Patent Document 5. Hereinafter, among the plurality of regions of each subpixel, a region having a relatively high luminance may also be referred to as a bright region, and a region having a relatively low luminance as a dark region.

Although the present embodiment illustrates a case where a video signal of the RGB format is input to the signal conversion circuit 20, the video signal to be input to the signal conversion circuit 20 may be of any format so long as it is a three-dimensional signal, e.g., the XYZ format or the YCrCb format.

As described above, the liquid crystal display device 100 is a multiprimary LCD which performs display in a VA mode and is multi-pixel driven. The liquid crystal display device 100 of the present embodiment is characterized by its methodology of signal conversion when a video signal for allowing gray to be displayed by a pixel is input. Hereinafter, the signal conversion methodology according to the present embodiment will be specifically described, prior to which a conventional methodology of signal conversion will be described as Reference Example, together with the reason why coloration occurs in that case.

Hereinafter, the luminance of a pixel as indicated by an input video signal may simply be referred to as an "input luminance", whereas the luminance of each subpixel as indicated by a multiprimary signal which is output from the signal conversion circuit 20 may simply be referred to as an "output luminance". When any reference is made to a specific value of an "input luminance" or "output luminance", it means a value which is normalized (i.e., "normalized luminance") based on the luminance when displaying a highest gray scale level (e.g., gray scale level of 255 in the case of an 8-bit signal) being defined as 1. Although the normalized luminance of each subpixel when displaying white is basically 1 (i.e., the luminance corresponding to the highest gray scale level), it may be set to 1 or less (a luminance corresponding to a gray scale level which is lower than the highest gray scale level, and corresponding to a gray scale level of less than 255 in the case of an 8-bit signal) in order to adjust the color temperature of white.

Figure 3:
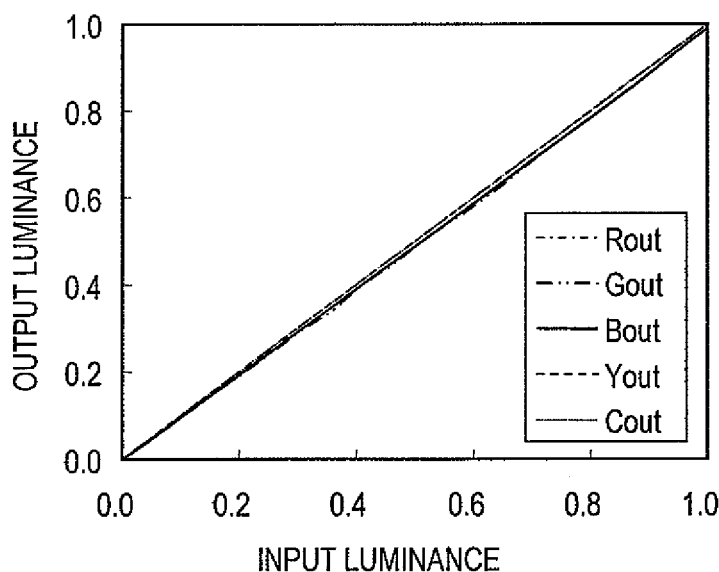
FIG. 3 A graph showing a relationship between input luminance and output luminance when signal conversion is performed by a conventional methodology.

FIG. 3 shows a relationship between input luminance and output luminance when signal conversion is performed by a conventional methodology. The case where the input luminance is 0 corresponds to displaying black, whereas the case where the input luminance is 1 corresponds to displaying white. Any other case (i.e., the input luminance is greater than 0 but less than 1) corresponds to displaying gray. When displaying black, which is an achromatic color of the lowest gray scale level, the luminance of each subpixel is 0. When displaying white, which is an achromatic color of the highest gray scale level, the luminance of each subpixel is typically 1. In other words, in each of the case of displaying black and the case of displaying white, the respective subpixels share essentially the same luminance. Therefore, when displaying gray, which is an achromatic color of an intermediate gray scale level, as shown in FIG. 3, it would be most natural that the output luminances of the red subpixel R, the green subpixel G, the blue subpixel B, the yellow subpixel Ye, and the cyan subpixel C (respectively shown as Rout, Gout, Bout, Yout, and Gout in the figure) be set substantially equal. In other words, it would be most usual that the output luminance of each subpixel have an essentially linear relationship with respect to input luminance.

Figure 4:
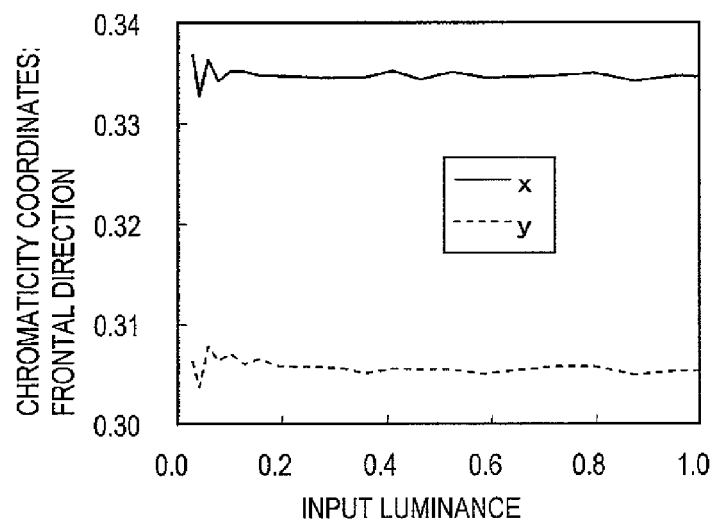
FIG. 4 A graph showing a relationship between the input luminance when a signal conversion as shown in FIG. 3 is performed and the chromaticity coordinates (x, y) of a gray representation when viewed from the frontal direction.
Figure 5:
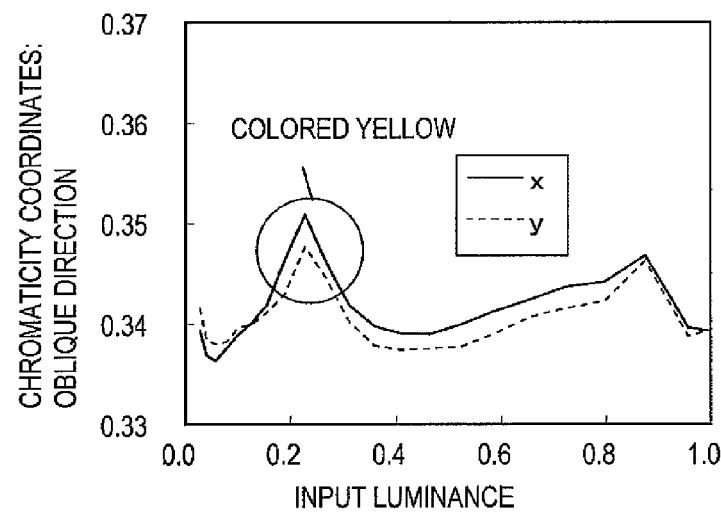
FIG. 5 A graph showing a relationship between the input luminance when a signal conversion as shown in FIG. 3 is performed and the chromaticity coordinates (x, y) of a gray representation when viewed from a 60° oblique direction.

FIG. 4 shows a relationship between the input luminance when a signal conversion as shown in FIG. 3 is performed and the chromaticity coordinates (x, y) of a gray representation when viewed from the frontal direction. FIG. 5 shows a relationship between the input luminance in this case and the chromaticity coordinates (x, y) of a gray representation when viewed from a 60° oblique direction. As shown in FIG. 4, the chromaticity in the frontal direction is essentially the same regardless of the input luminance. On the other hand, as shown in FIG. 5, the chromaticity in the 60° oblique direction has a drastic change at some input luminance, such that the gray representation is colored yellow around an input luminance of 0.25.

Figure 6:
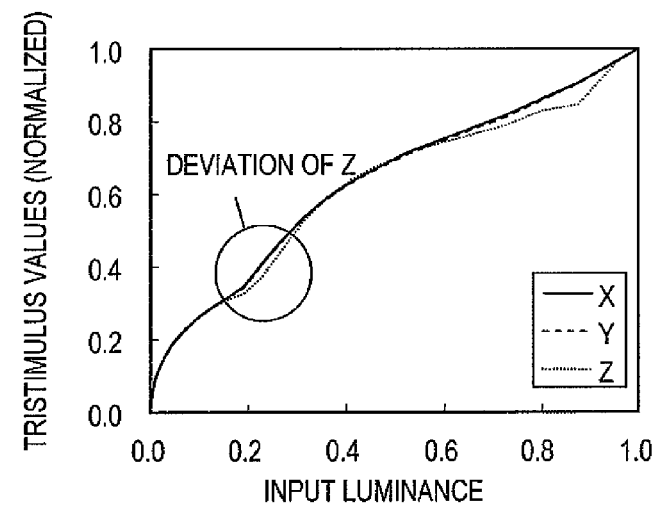
FIG. 6 A graph showing a relationship between the input luminance when a signal conversion as shown in FIG. 3 is performed and the tristimulus values X, Y, and Z of a gray representation when viewed from a 60° oblique direction.

Now, the reason why coloration occurs in oblique directions will be described with reference to FIG. 6. FIG. 6 is a graph showing a relationship between the input luminance and tristimulus values X, Y, and Z (normalized values) when a gray representation is viewed from a 60° oblique direction. As shown in FIG. 6, the relationship of the tristimulus values X, Y, and Z near the input luminance of 0.25 is different from that associated with any other input luminance. Specifically, at any other input luminance, X, Y, and Z are essentially equal, whereas Z is smaller than X and Y near the input luminance of 0.25.

By using the tristimulus values X, Y, and Z, the chromaticity coordinates (x, y) are represented as x=X/(X+Y+Z), y=Y/(X+Y+Z). In other words, the chromaticity xy of a given color is determined by the ratio of the tristimulus values X, Y, and Z composing that color. In FIG. 6, relatively speaking, Z is smaller than X and Y near the input luminance of 0.25. Z is a component which is responsible for bluishness; that is, Z being smaller than X and Y means weaker bluishness, i.e., stronger yellowishness. Therefore, near the input luminance of 0.25, where Z becomes smaller than X and Y, a gray representation suffers from a yellow coloration. As mentioned above, when signal conversion is performed by a conventional methodology, coloration occurs in a gray representation when viewed from an oblique direction, whereby the display quality is deteriorated.

Figure 7:
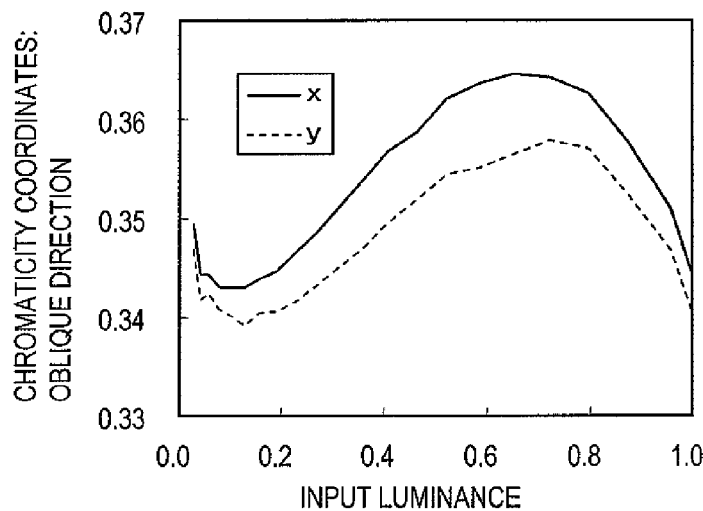
FIG. 7 A graph showing a relationship between the input luminance when a signal conversion as shown in FIG. 3 is performed and the chromaticity coordinates (x, y) of a gray representation when viewed from a 60° oblique direction, in a liquid crystal display device which does not perform multi-pixel driving.
Figure 8:
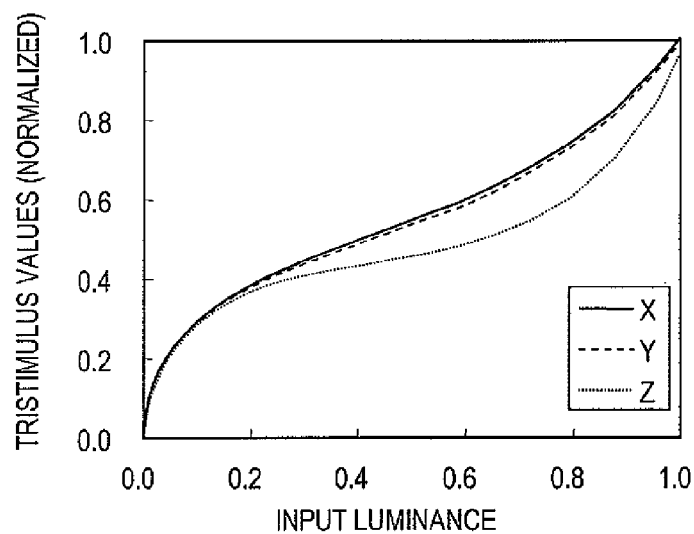
FIG. 8 A graph showing a relationship between the input luminance when a signal conversion as shown in FIG. 3 is performed and the tristimulus values X, Y, and Z of a gray representation when viewed from a 60° oblique direction, in a liquid crystal display device which does not perform multi-pixel driving.

For reference's sake, with respect to the case of not performing multi-pixel driving, a relationship between the input luminance and the chromaticity coordinates (x, y) when a gray representation is observed from a 60° oblique direction is shown in FIG. 7, and a relationship between the input luminance and the tristimulus values X, Y, and Z is shown in FIG. 8. As shown in FIG. 7, the chromaticity in the 60° oblique direction greatly differs depending on the input luminance, and thus, on the whole, there are large changes in chromaticity that are dependent on input luminance. The reason thereof is that, as shown in FIG. 8, the relationship of the tristimulus values X, Y, and Z greatly differs depending on the input luminance.

As can be seen from a comparison between FIG. 5 and FIG. 7, in the case of performing multi-pixel driving, the changes in chromaticity with respect to input luminance are small on the whole. However, there is a drastic change in chromaticity near the input luminance of 0.25, and a coloration phenomenon associated with this change in chromaticity deteriorates the display quality. The cause for the drastic change in chromaticity is a local deviation of Z with respect to X and Y, as has already been described.

The cause for this deviation is explained as follows. When performing multi-pixel driving, the bright region in the blue subpixel B decreases in luminance when observed from an oblique direction (gray scale inversion). Therefore, the rate of increase in output luminance is reduced for the entire blue subpixel B (as observed in the form of an average luminance of the bright region and the dark region). On the other hand, the rate of increase in output luminance is hardly changed in any other subpixel. As a result, among X, Y, and Z of one entire pixel, it is Z that is strongly affected by the smaller rate of increase in the output luminance of the blue subpixel B (because the blue subpixel B has a low component ratio in X and Y and a high component ratio in Z as will be described later), and thus Z is deviated from X and Y.

As described above, in a multiprimary liquid crystal display device which performs multi-pixel driving, a coloration phenomenon occurs mainly near the input luminance of 0.25, thus deteriorating the display quality.

Figure 9:
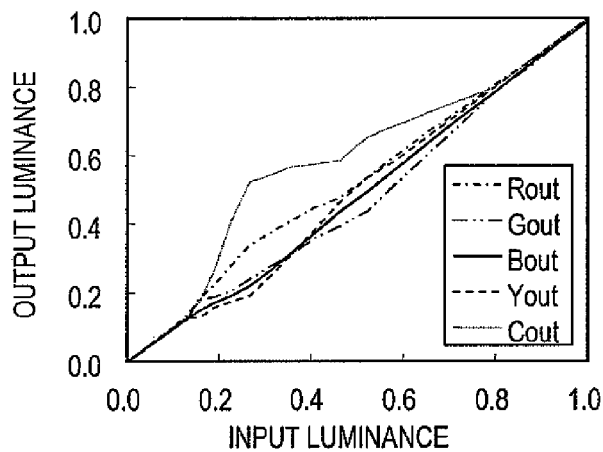
FIG. 9 A graph showing an exemplary relationship between input luminance and output luminance when a video signal for displaying gray is input to a signal conversion circuit of the liquid crystal display device 100.

When a video signal for allowing a gray of a luminance in a predetermined range to be displayed by a pixel is input, the signal conversion circuit 20 of the present embodiment performs conversion of the video signal so that the yellow subpixel Ye has the lowest normalized luminance among the normalized luminances of the plurality of subpixels. FIG. 9 shows an exemplary relationship between input luminance and output luminance when a video signal for displaying gray is input to the signal conversion circuit 20 of the present embodiment.

In the example shown in FIG. 9, near the input luminance of 0.25 associated with occurrence of a coloration phenomenon, the output luminance of the yellow subpixel Ye is lower and the output luminances of the cyan subpixel C and the red subpixel R are higher than in the conventional example shown in FIG. 3. Moreover, the output luminances of the green subpixel G and the blue subpixel B are not of any linear relationship with input luminance. As a result, in an input luminance range of no less than 0.15 and no more than 0.35, the output luminance is in descending order from the cyan subpixel C, to the red subpixel R, to the green subpixel G, to the blue subpixel B, and to the yellow subpixel Ye (Cout≥Rout≥Gout≥Bout≥Yout). In other words, in the input luminance range of no less than 0.15 and no more than 0.35, the output luminance of the yellow subpixel Ye is the lowest, and the output luminance of the cyan subpixel C is the highest. Note that, the output luminance of each subpixel will always increase in response to an increase in input luminance. In other words, the output luminance of each subpixel is of a monotonously increasing relationship with input luminance.

Figure 10:
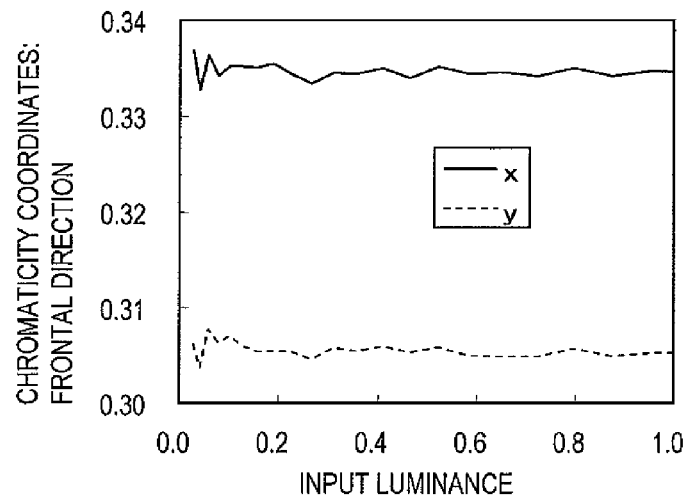
FIG. 10 A graph showing a relationship between the input luminance when a signal conversion as shown in FIG. 9 is performed and the chromaticity coordinates (x, y) of a gray representation when viewed from the frontal direction.
Figure 11:
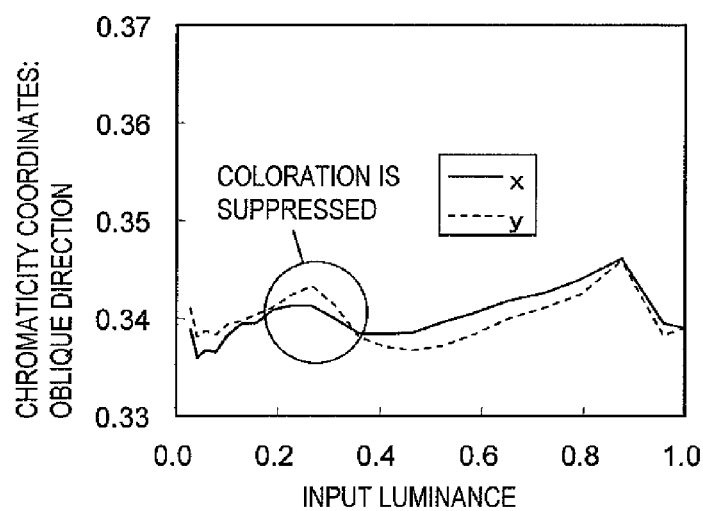
FIG. 11 A graph showing a relationship between the input luminance when a signal conversion as shown in FIG. 9 is performed and the chromaticity coordinates (x, y) of a gray representation when viewed from a 60° oblique direction.

As shown in FIG. 9, by performing a video signal conversion so that the normalized luminance of the yellow subpixel Ye becomes the lowest near the input luminance of 0.25, the coloration of a gray representation can be suppressed. FIG. 10 shows a relationship between the input luminance when a signal conversion as shown in FIG. 9 is performed and the chromaticity coordinates (x, y) of a gray representation when viewed from the frontal direction. FIG. 11 shows a relationship between the input luminance in this case and the chromaticity coordinates (x, y) of a gray representation when viewed from a 60° oblique direction.

As shown in FIG. 10, the chromaticity in the frontal direction is essentially the same regardless of the input luminance. In the example shown in FIG. 9, the output luminance of the yellow subpixel Ye is made lower than conventionally, but nevertheless, essentially the same chromaticity is obtained in the frontal direction on the whole. This is because the output luminances of the red subpixel R, the green subpixel G, the blue subpixel B, and the cyan subpixel C are appropriately set (controlled) to ensure this.

Moreover, as shown in FIG. 11, the chromaticity in the 60° oblique direction is slightly changed near the input luminance of 0.25, but its amount of change is smaller than conventionally, as can be clearly seen from a comparison between FIG. 11 and FIG. 5. In other words, the coloration of a gray representation when viewed from an oblique direction is suppressed.

Figure 12:
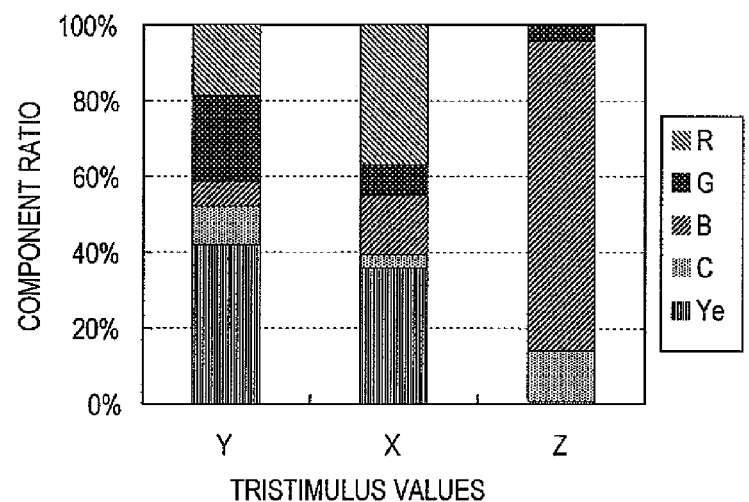
FIG. 12 A graph showing component ratios of primary colors that are displayed by the respective subpixels, in each of the tristimulus values X, Y, and Z when a white representation is observed from the frontal direction.
Figure 13:
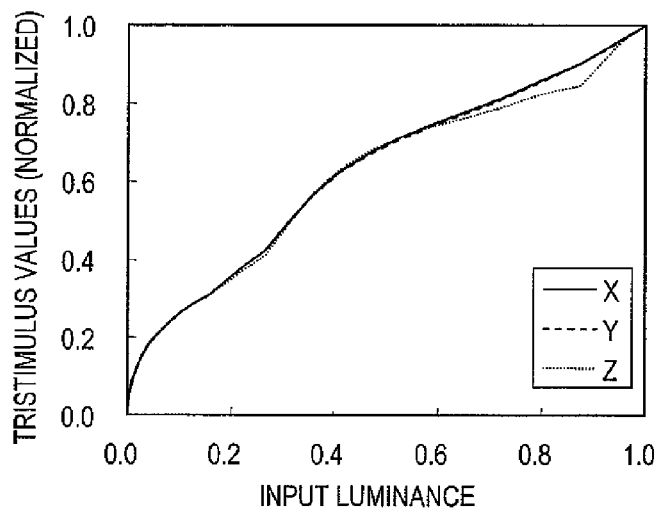
FIG. 13 A graph showing a relationship between the input luminance when a signal conversion as shown in FIG. 9 is performed and the tristimulus values X, Y, and Z of a gray representation when viewed from a 60° oblique direction.

Thus, by performing a video signal conversion as in the present embodiment, the coloration of a gray representation can be suppressed, whereby deteriorations in the display quality can be suppressed. Hereinafter, the reason thereof will be described with reference to FIG. 12 and FIG. 13. FIG. 12 is a graph showing component ratios of primary colors that are displayed by the respective subpixels, in each of the tristimulus values X, Y, and Z when a white representation is observed from the frontal direction. FIG. 13 is a graph showing a relationship between the input luminance and tristimulus values X, Y, and Z when a gray representation is viewed from a 60° oblique direction.

As can be seen from FIG. 12, the component ratio of the yellow subpixel Ye in each of X and Y is about 40%, whereas the component ratio of the yellow subpixel Ye in Z is 1% or less, which is significantly low. Therefore, by reducing the output luminance of the yellow subpixel Ye near the input luminance of 0.25, it is possible to decrease X and Y without hardly lowering Z, thus being able to reduce the deviation of Z near the input luminance of 0.25 (deviation relative to X and Y). Moreover, the component ratio of the yellow subpixel Ye is essentially equal in X and Y, so that X and Y can be reduced essentially by the same rate by reducing the output luminance of the yellow subpixel Ye. Therefore, no substantial deviation will be introduced between X and Y, which have always been equal.

Thus, by reducing the output luminance of the yellow subpixel Ye, it is possible to reduce X and Y essentially by the same rate, while keeping Z essentially intact. Therefore, as shown in FIG. 13, the tristimulus values X, Y, and Z can be made essentially equal near the input luminance of 0.25. As a result, the coloration of a gray representation is suppressed.

Note that, in the example shown in FIG. 9, near the input luminance of 0.25, not only the output luminance of the yellow subpixel Ye is made lower than conventionally, but also the output luminances of the cyan subpixel C, the red subpixel R, and the green subpixel G are made higher than conventionally. The reason thereof is described below.

Among the tristimulus values X, Y, and Z, it is Y that represents the brightness of that color. As shown in FIG. 12, the component ratio of the yellow subpixel Ye in Y is as large as about 40%, and therefore merely decreasing the output luminance of the yellow subpixel Ye will greatly lower the brightness in the frontal direction. In other words, the voltage-transmittance characteristics in the frontal direction will become deviated. The chromaticity will also become deviated toward blue. In other words, the chromaticities x and y will both become small.

In order to compensate for these, the output luminances of the subpixels other than the yellow subpixel Ye may be increased. However, as can be seen from FIG. 12, the blue subpixel B has a small component ratio in Y, and in view of the deviation of the frontal-direction chromaticity toward blue as has already been described, it is not preferable to increase the output luminance of the blue subpixel B. Therefore, in order to compensate for the brightness reduction and the chromaticity deviation in the frontal direction, it is preferable to increase the output luminances of the cyan subpixel C, the red subpixel R, and the green subpixel G. More specifically, it is preferable to increase the output luminance of the red subpixel R in order to increase the chromaticity x, and it is preferable to increase the output luminances of the cyan subpixel C and the green subpixel G in order to increase the chromaticity y. Although the example shown in FIG. 9 illustrates that the output luminance of the cyan subpixel C is the highest near the input luminance of 0.25, the output luminance of the red subpixel R may be the highest, or the luminance of the green subpixel G may be the highest.

As shown in FIG. 12, the low component ratio of the red subpixel R in Z is as low as 1% or less. Therefore, it might be conceivable to lower the output luminance of the red subpixel R, instead of the yellow subpixel Ye; however, this is not preferable for the following reasons. When the output luminance of the red subpixel R is lowered, X and Y can be reduced without hardly lowering Z, as in the case of lowering the output luminance of the yellow subpixel Ye, so that the deviation of Z relative to X and Y can be reduced. At this time, in the frontal direction, the luminance is slightly lowered and the chromaticity x is deviated so as to become smaller. Therefore, this deviation in the frontal direction must be compensated for. In order to increase the chromaticity x, the output luminances of the yellow subpixel Ye and the green subpixel G may be increased; however, the output luminances of the yellow subpixel Ye and the green subpixel G cannot be increased to such an extent that the deviation in the chromaticity x is sufficiently compensated for. The reason is that, since the component ratios of the yellow subpixel Ye and the green subpixel G in Y are high, the voltage-transmittance characteristics in the frontal direction will be deviated if the output luminances of the yellow subpixel Ye and the green subpixel G are increased to such an extent that the deviation in the chromaticity x is sufficiently compensated for.

Instead of decreasing X and Y to become closer to Z, it might be conceivable to increase Z to become closer to X and Y; however, this is not preferable for the following reasons. In order to increase Z so as to become closer to X and Y, it is necessary to increase the output luminance of the blue subpixel B, which has a high component ratio in Z and low component ratios in X and Y. In this case, coloration in oblique directions will be suppressed, but the chromaticity in the frontal direction will be deviated toward blue, thus making it necessary to increase the output luminance of the yellow subpixel Ye in order to compensate for this deviation. However, since the component ratio of the yellow subpixel Ye in Y is high, the voltage-transmittance characteristics in the frontal direction will be deviated if the output luminance of the yellow subpixel Ye is increased to such an extent that the chromaticity deviation is sufficiently compensated for. Moreover, X and Y in oblique directions will become large, thus defeating the purpose. Therefore, it is preferable that the output luminance of the blue subpixel B is the lowest next to the output luminance of the yellow subpixel Ye near the input luminance of 0.25.

Although the example shown in FIG. 9 illustrates that the output luminance of the yellow subpixel Ye is the lowest in the input luminance range of no less than 0.15 and no more than 0.35, it is not necessary that the output luminance of the yellow subpixel Ye remains the lowest throughout this entire range. So long as the output luminance of the yellow subpixel Ye is the lowest at least in the input luminance range of no less than 0.2 and no more than 0.3, the coloration of a gray representation when viewed from an oblique direction can be sufficiently suppressed.

Figure 14:
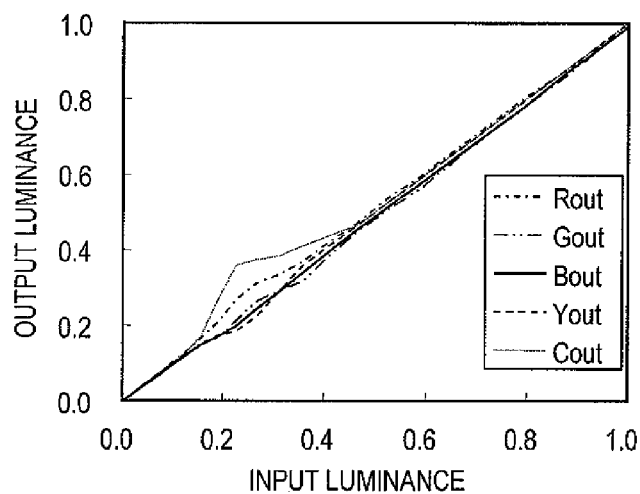
FIG. 14 A graph showing an exemplary relationship between input luminance and output luminance when a video signal for displaying gray is input to a signal conversion circuit of the liquid crystal display device 100.

FIG. 14 shows another exemplary relationship between input luminance and output luminance when a video signal for displaying gray is input to the signal conversion circuit 20. In the example shown in FIG. 14, in the input luminance range of no less than 0.2 and no more than 0.3, the output luminance is in descending order from the cyan subpixel C, to the red subpixel R, to the green subpixel G, to the blue subpixel B, and to the yellow subpixel Ye (Cout≥Rout≥Gout≥Bout≥Yout). That is, the range in which the output luminance of the yellow subpixel Ye remains the lowest is narrower than in the example shown in FIG. 9.

Figure 15:
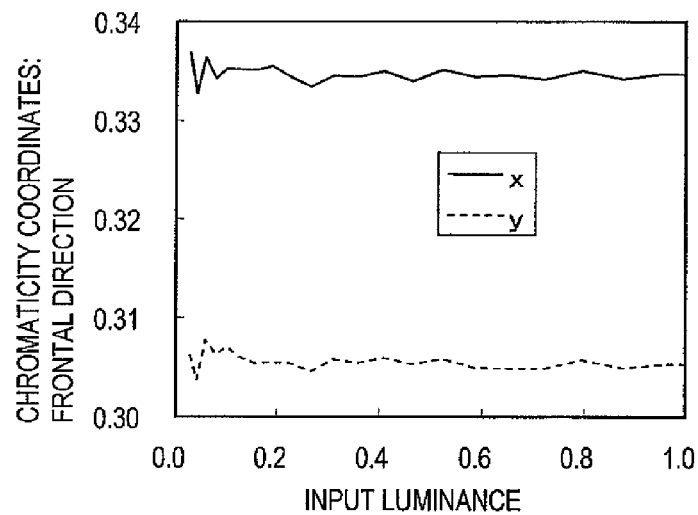
FIG. 15 A graph showing a relationship between the input luminance when a signal conversion as shown in FIG. 14 is performed and the chromaticity coordinates (x, y) of a gray representation when viewed from the frontal direction.
Figure 16:
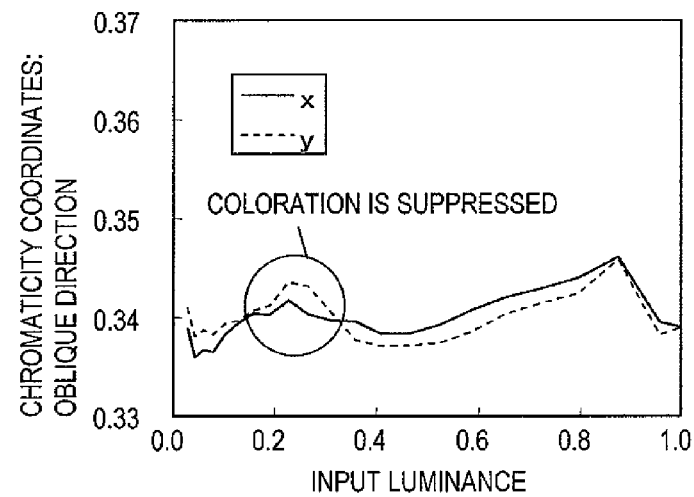
FIG. 16 A graph showing a relationship between the input luminance when a signal conversion as shown in FIG. 14 is performed and the chromaticity coordinates (x, y) of a gray representation when viewed from a 60° oblique direction.

FIG. 15 shows a relationship between the input luminance when a signal conversion as shown in FIG. 14 is performed and the chromaticity coordinates (x, y) of a gray representation when viewed from the frontal direction. FIG. 16 shows a relationship between the input luminance in this case and the chromaticity coordinates (x, y) of a gray representation when viewed from a 60° oblique direction.

As shown in FIG. 15, the chromaticity in the frontal direction is essentially the same regardless of the input luminance. Moreover, although the chromaticity in the 60° oblique direction slightly changes near the input luminance of 0.25 as shown in FIG. 16, the amount of change is smaller than conventional, as can be clearly seen from a comparison between FIG. 16 and FIG. 5. In other words, the coloration of a gray representation is suppressed. Thus, by ensuring that the output luminance of the yellow subpixel Ye is the lowest in the input luminance range of no less than 0.2 and no more than 0.3, the coloration of a gray representation when viewed from an oblique direction can be sufficiently suppressed.

As can be seen from a comparison between FIG. 11 and FIG. 16, the change in chromaticity in the signal conversion methodology illustrated in FIG. 14 is slightly greater than in the signal conversion methodology illustrated in FIG. 9.

Therefore, in order to suppress the coloration phenomenon with greater certainty, it is preferable that the output luminance of the yellow subpixel Ye is the lowest not only in the input luminance range of no less than 0.2 and no more than 0.3, but also in the input luminance range of no less than 0.15 but less than 0.2 and in the input luminance range of more than 0.3 but no more than 0.35. In other words, it is preferable that the output luminance of the yellow subpixel Ye is the lowest in the input luminance range of no less than 0.15 and no more than 0.35.

Figure 17:
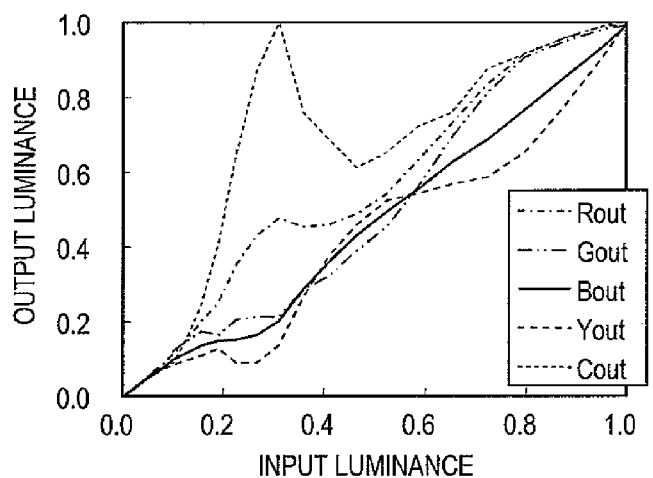
FIG. 17 A graph showing an exemplary relationship between input luminance and output luminance when a video signal for displaying gray is input to a signal conversion circuit of the liquid crystal display device 100.

FIG. 17 shows still another exemplary relationship between input luminance and output luminance when a video signal for displaying gray is input to the signal conversion circuit 20. In the example shown in FIG. 17, in the input luminance range of no less than 0.15 and no more than 0.35, the output luminance is in descending order from the cyan subpixel C, to the red subpixel R, to the green subpixel G, to the blue subpixel B, and to the yellow subpixel Ye (Cout≥Rout≥Gout≥Bout≥Yout), and the output luminance of the yellow subpixel Ye is the lowest in this range, as in the example shown in FIG. 9. However, in the example shown in FIG. 17, unlike in the example shown in FIG. 9, the output luminance of each subpixel does not necessarily increase with an increase in input luminance. In other words, the output luminance of each subpixel is not of a monotonously increasing relationship with input luminance.

Figure 18:
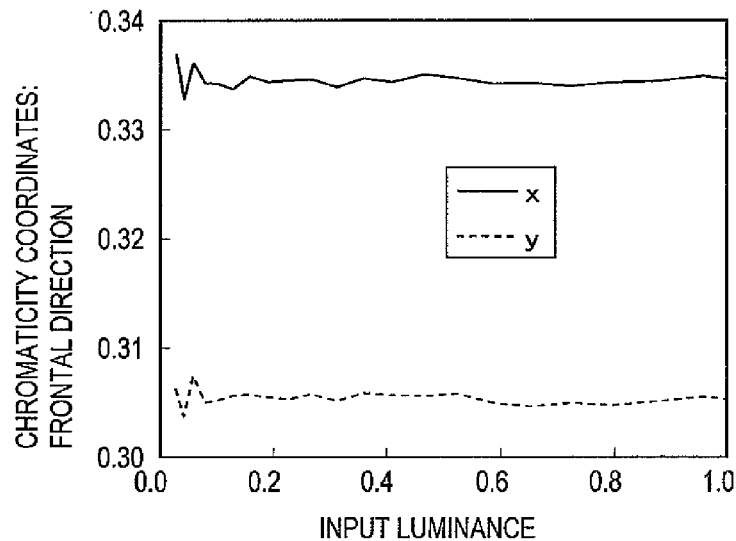
FIG. 18 A graph showing a relationship between the input luminance when a signal conversion as shown in FIG. 17 is performed and the chromaticity coordinates (x, y) of a gray representation when viewed from the frontal direction.
Figure 19:
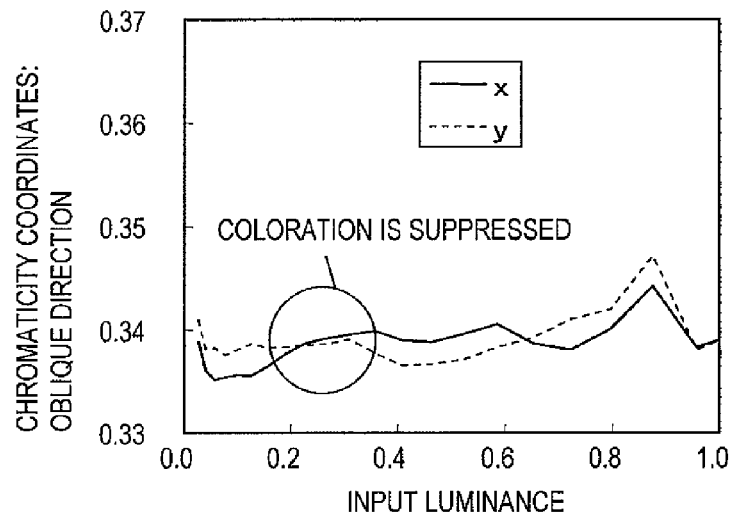
FIG. 19 A graph showing a relationship between the input luminance when a signal conversion as shown in FIG. 17 is performed and the chromaticity coordinates (x, y) of a gray representation when viewed from a 60° oblique direction.
Figure 20:
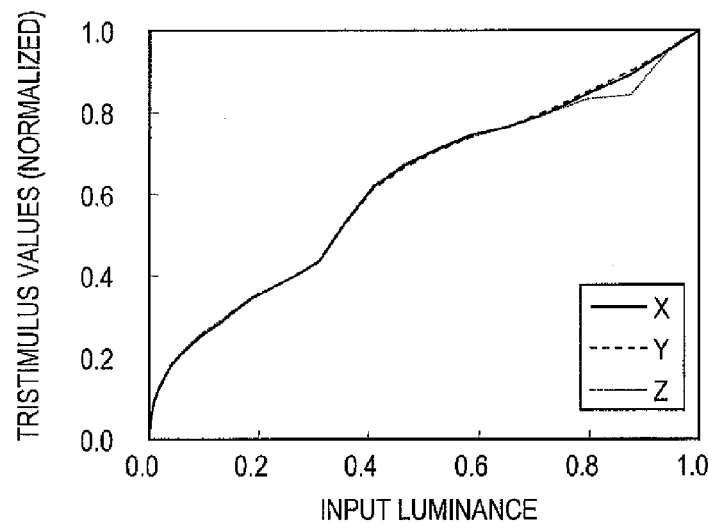
FIG. 20 A graph showing a relationship between the input luminance when a signal conversion as shown in FIG. 17 is performed and the tristimulus values X, Y, and Z of a gray representation when viewed from a 60° oblique direction.

FIG. 18 shows a relationship between the input luminance when a signal conversion as shown in FIG. 17 is performed and the chromaticity coordinates (x, y) of a gray representation when viewed from the frontal direction. FIG. 19 shows a relationship between the input luminance in this case and the chromaticity coordinates (x, y) of a gray representation when viewed from a 60° oblique direction. Furthermore, FIG. 20 shows a relationship the input luminance in this case and the tristimulus values X, Y, and Z of a gray representation when viewed from a 60° oblique direction.

As shown in FIG. 18, the chromaticity in the frontal direction is essentially the same regardless of the input luminance. As for the 60° oblique direction, as shown in FIG. 19, the change in chromaticity near the input luminance of 0.25 is suppressed, and the coloration of a gray representation is suppressed. This is because, as shown in FIG. 20, the tristimulus values X, Y, and Z are essentially equal near the input luminance of 0.25.

As can be seen from a comparison between FIG. 19 and FIGS. 11 and 16, performing a signal conversion as shown in FIG. 17 provides for a further suppression of coloration, as compared to the case of performing signal conversions as shown in FIG. 9 and FIG. 14. Thus, when the output luminance of at least one of the plurality of subpixels is not of a monotonously increasing relationship with input luminance, an increased freedom of output luminance settings is provided, whereby the effect of coloration suppression can be further enhanced.

The examples described above illustrate techniques of reducing a drastic change in chromaticity near the input luminance of 0.25, or as it were, techniques of eliminating points of inflection in changes in chromaticity. Deteriorations in the display quality can also be suppressed by adjusting the output luminance of each subpixel so that changes in chromaticity are unidirectional.

Figure 21:
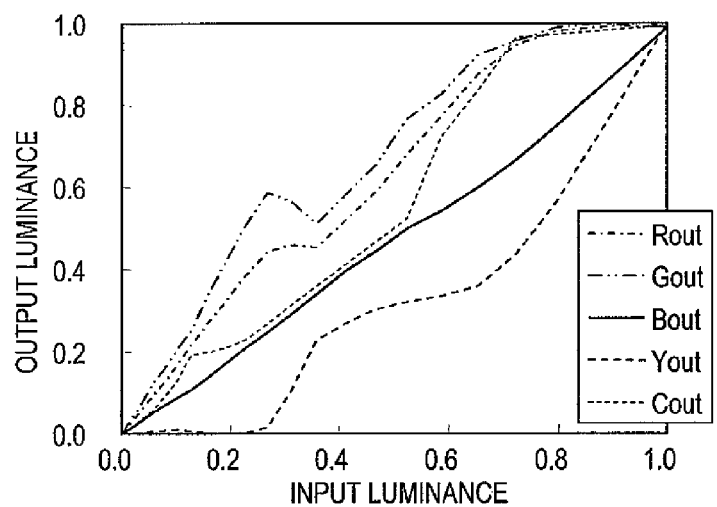
FIG. 21 A graph showing an exemplary relationship between input luminance and output luminance when a video signal for displaying gray is input to a signal conversion circuit of the liquid crystal display device 100.

FIG. 21 shows an exemplary relationship between input luminance and output luminance in the case of performing such a signal conversion. In the example shown in FIG. 21, in the input luminance range of no less than 0.15 and no more than 0.35, the output luminance is in descending order from the green subpixel G, to the red subpixel R, to the cyan subpixel C, to the blue subpixel B, and to the yellow subpixel Ye (Gout≥Rout≥Cout≥Bout≥Yout), and the output luminance of the yellow subpixel Ye is the lowest in this range. Moreover, among the plurality of subpixels, the output luminances of some subpixels (specifically, the blue subpixel B and the cyan subpixel C) are of a monotonously increasing relationship with input luminance, whereas the output luminances of the other subpixels (specifically, the red subpixel R, the green subpixel G, and the yellow subpixel Ye) are not of a monotonously increasing relationship with input luminance.

Figure 22:
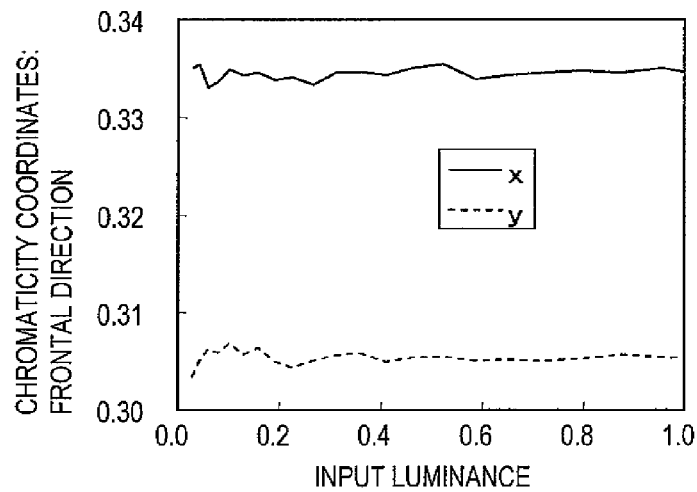
FIG. 22 A graph showing a relationship between the input luminance when a signal conversion as shown in FIG. 21 is performed and the chromaticity coordinates (x, y) of a gray representation when viewed from the frontal direction.
Figure 23:
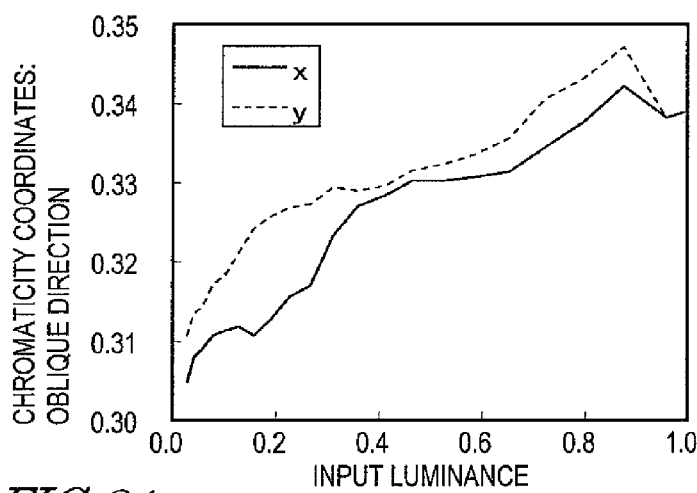
FIG. 23 A graph showing a relationship between the input luminance when a signal conversion as shown in FIG. 21 is performed and the chromaticity coordinates (x, y) of a gray representation when viewed from a 60° oblique direction.
Figure 24:
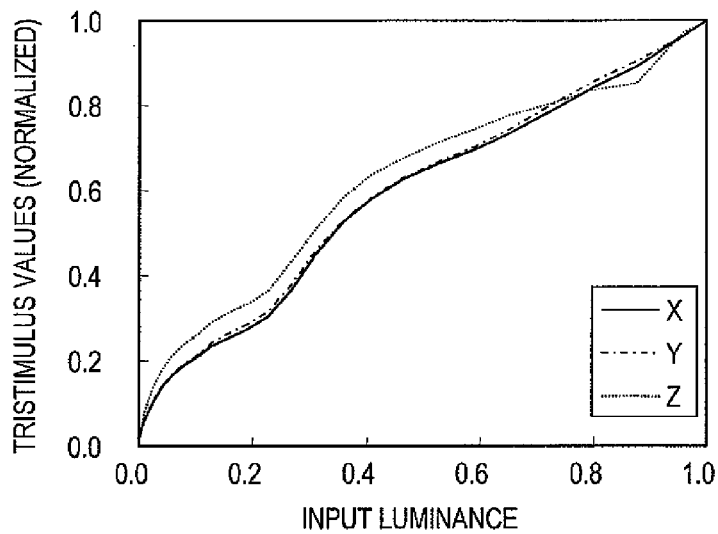
FIG. 24 A graph showing a relationship between the input luminance when a signal conversion as shown in FIG. 21 is performed and the tristimulus values X, Y, and Z of a gray representation when viewed from a 60° oblique direction.

FIG. 22 shows a relationship between the input luminance when a signal conversion as shown in FIG. 21 is performed and the chromaticity coordinates (x, y) of a gray representation when viewed from the frontal direction. FIG. 23 shows a relationship between the input luminance in this case and the chromaticity coordinates (x, y) of a gray representation when viewed from a 60° oblique direction. Furthermore, FIG. 24 shows a relationship between the input luminance in this case and the tristimulus values X, Y, and Z of a gray representation when viewed from a 60° oblique direction.

As shown in FIG. 22, the chromaticity in the frontal direction is essentially the same regardless of the input luminance. On the other hand, as shown in FIG. 23, the chromaticity in the 60° oblique direction varies depending on the input luminance. However, the change in chromaticity in the 60° oblique direction occurs as a uniform change from yellow to blue, with decreasing input luminance (i.e., from higher gray scale levels toward lower gray scale levels). This is because, as shown in FIG. 24, Z becomes relatively large as compared to X and Y as the input luminance decreases, thus causing a gradual change into blue. Thus, when the change in chromaticity is unidirectional, there is little oddness even if coloration occurs, and deteriorations in the display quality can be suppressed.

Figure 25:
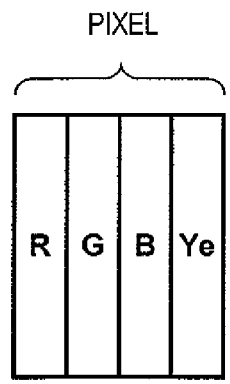
FIG. 25 A diagram showing an exemplary pixel construction of the liquid crystal display device 100.

Although the description heretofore illustrates cases where one pixel is defined by the five subpixels of a red subpixel R, a green subpixel G, a blue subpixel B, a yellow subpixel Ye, and a cyan subpixel C, the present invention is not limited thereto. The plurality of subpixels defining each pixel may at least include a red subpixel R, a green subpixel G, a blue subpixel B, and a yellow subpixel Ye. For example, as shown in FIG. 25, each pixel may be defined by the four subpixels of a red subpixel R, a green subpixel G, a blue subpixel B, and a yellow subpixel Ye. Table 2 represents the chromaticity xy and relative luminance Y of each primary color that is displayed by the red subpixel R, the green subpixel G, the blue subpixel B, and the yellow subpixel Ye in this case (where the values are based on the luminance of white, defined as 100, that is displayed by the pixel).

TABLE 2

| | x | y | Y |
|---|---|---|---|
| R | 0.683 | 0.312 | 12.0 |
| G | 0.239 | 0.631 | 28.6 |
| B | 0.144 | 0.055 | 8.2 |
| Ye | 0.478 | 0.512 | 51.2 |

Figure 26:
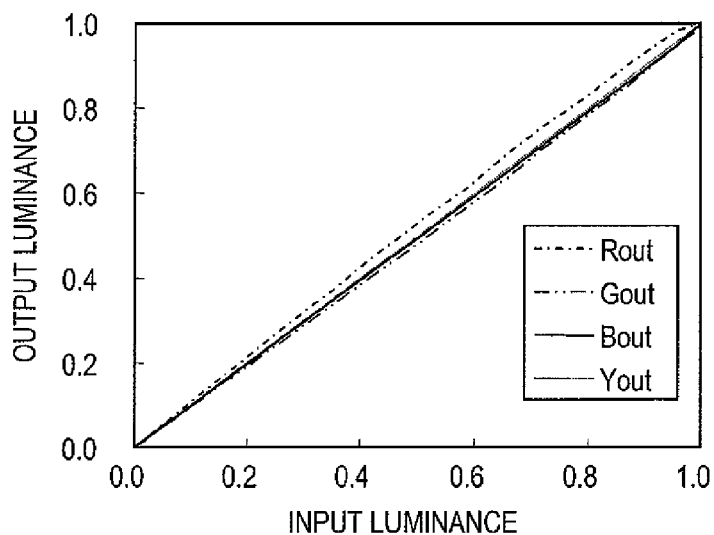
FIG. 26 A graph showing a relationship between input luminance and output luminance when signal conversion is performed by a conventional methodology.

FIG. 26 shows a relationship between input luminance and output luminance when a signal conversion is performed by a conventional methodology, in the case where each pixel is defined by four subpixels. In this case, too, similarly to the case described with reference to FIG. 3, it would be most natural that the output luminance of each subpixel have an essentially linear relationship with respect to input luminance, that is, the output luminances of the red subpixel R, the green subpixel G, the blue subpixel B, and the yellow subpixel Ye (respectively shown as Rout, Gout, Bout, and Yout in the figure) be set substantially equal.

Figure 27:
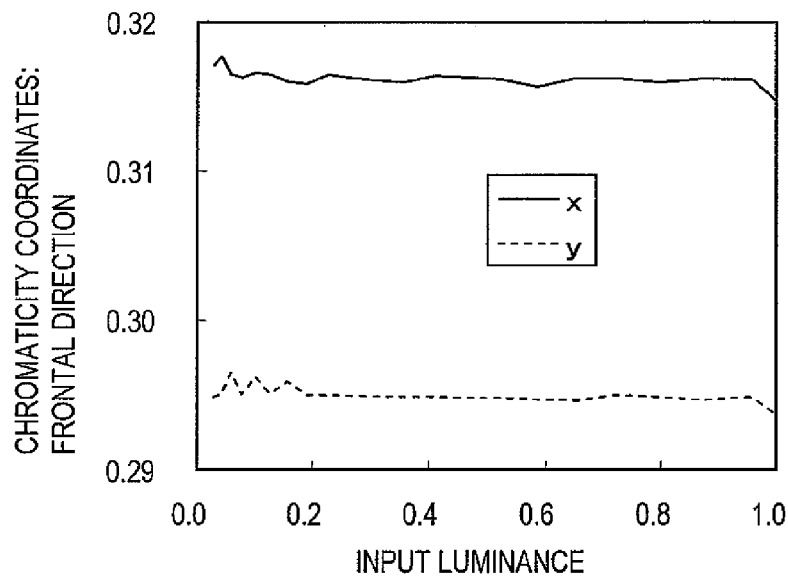
FIG. 27 A graph showing a relationship between the input luminance when a signal conversion as shown in FIG. 26 is performed and the chromaticity coordinates (x, y) of a gray representation when viewed from the frontal direction.
Figure 28:
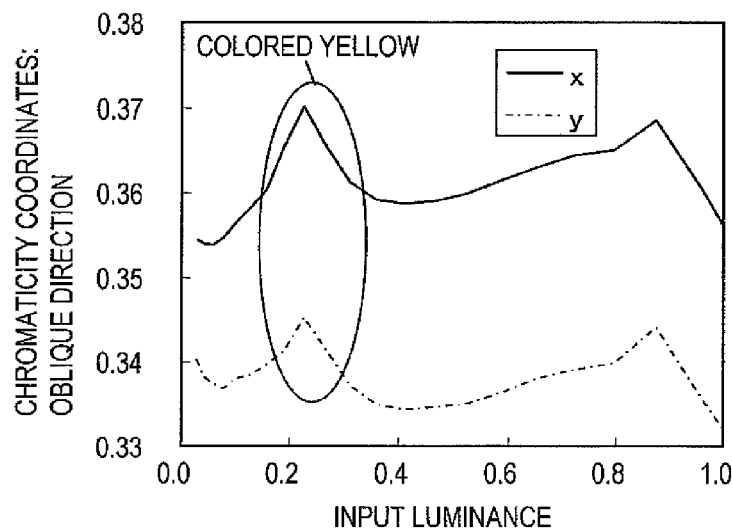
FIG. 28 A graph showing a relationship between the input luminance when a signal conversion as shown in FIG. 26 is performed and the chromaticity coordinates (x, y) of a gray representation when viewed from a 60° oblique direction.
Figure 29:
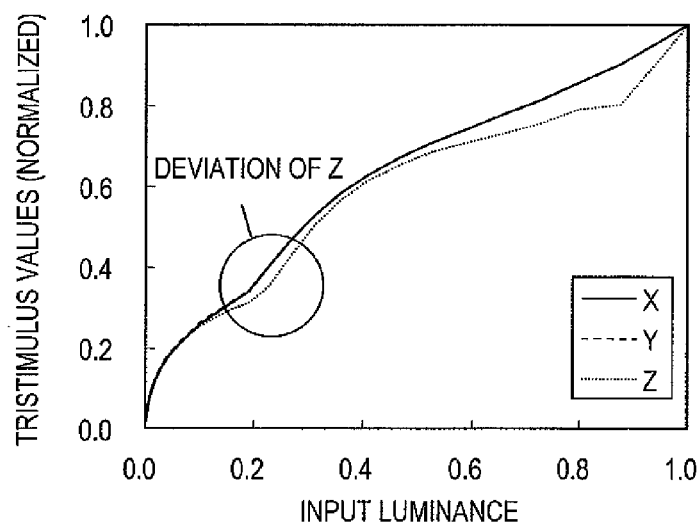
FIG. 29 A graph showing a relationship between the input luminance when a signal conversion as shown in FIG. 26 is performed and the tristimulus values X, Y, and Z of a gray representation when viewed from a 60° oblique direction.

FIG. 27 shows a relationship between the input luminance when a signal conversion as shown in FIG. 26 is performed and the chromaticity coordinates (x, y) of a gray representation when viewed from the frontal direction. FIG. 28 shows a relationship between the input luminance in this case and the chromaticity coordinates (x, y) of a gray representation when viewed from a 60° oblique direction. Furthermore, FIG. 29 shows a relationship between the input luminance in this case and the tristimulus values X, Y, and Z of a gray representation when viewed from a 60° oblique direction.

As shown in FIG. 27, the chromaticity in the frontal direction is essentially the same regardless of the input luminance. On the other hand, as shown in FIG. 28, the chromaticity in the 60° oblique direction has a drastic change at some input luminance, such that the gray representation is colored yellow around an input luminance of 0.25. This is because, as shown in FIG. 29, Z is deviated from X and Y (so as to become smaller than X and Y) near the input luminance of 0.25.

In the case where each pixel is defined by four subpixels, too, coloration of a gray representation can be suppressed by performing a signal conversion in such a manner that the output luminance of the yellow subpixel Ye is the lowest in a predetermined range of input luminance (at least in an input luminance range of no less than 0.2 and no more than 0.3, and preferably in an input luminance range of no less than 0.15 and no more than 0.35).

Figure 30:
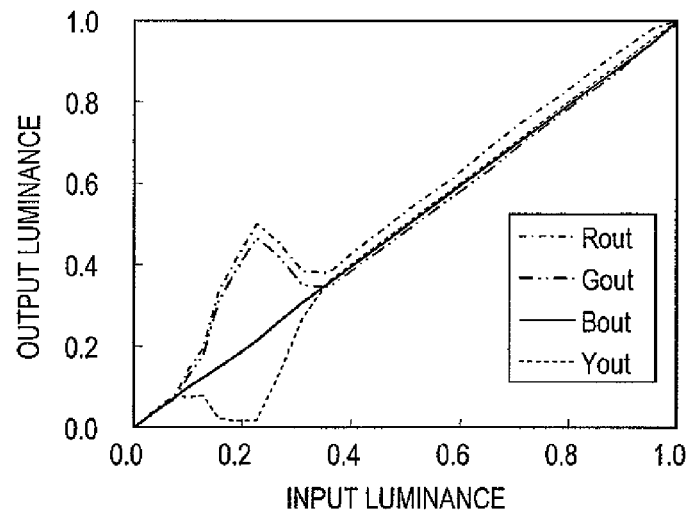
FIG. 30 A graph showing an exemplary relationship between input luminance and output luminance when a video signal for displaying gray is input to a signal conversion circuit of the liquid crystal display device 100.

FIG. 30 shows an exemplary relationship between input luminance and output luminance when a video signal for displaying gray is input to the signal conversion circuit 20 of the present embodiment, in the case where each pixel is defined by four subpixels. In the example shown in FIG. 30, in the input luminance range of no less than 0.15 and no more than 0.35, the output luminance is in descending order from the red subpixel R, to the green subpixel G, to the blue subpixel B, and to the yellow subpixel Ye (Rout≥Gout≥Bout≥Yout), and the output luminance of the yellow subpixel Ye is the lowest in this range.

Figure 31:
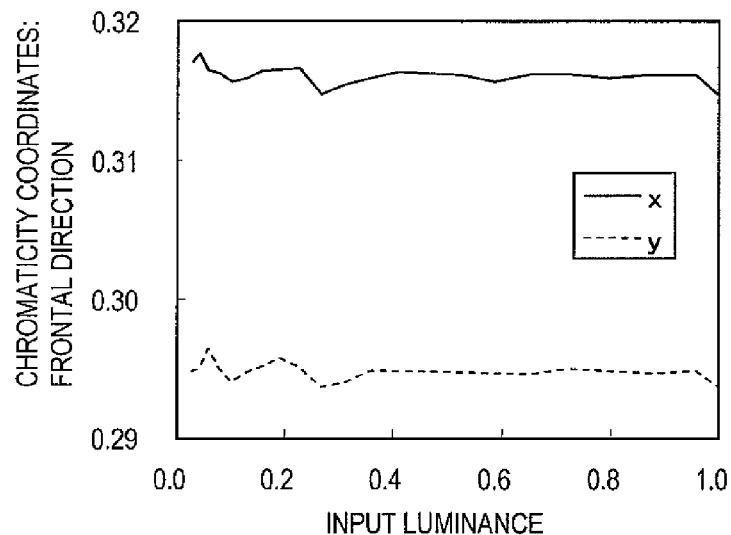
FIG. 31 A graph showing a relationship between the input luminance when a signal conversion as shown in FIG. 30 is performed and the chromaticity coordinates (x, y) of a gray representation when viewed from the frontal direction.
Figure 32:
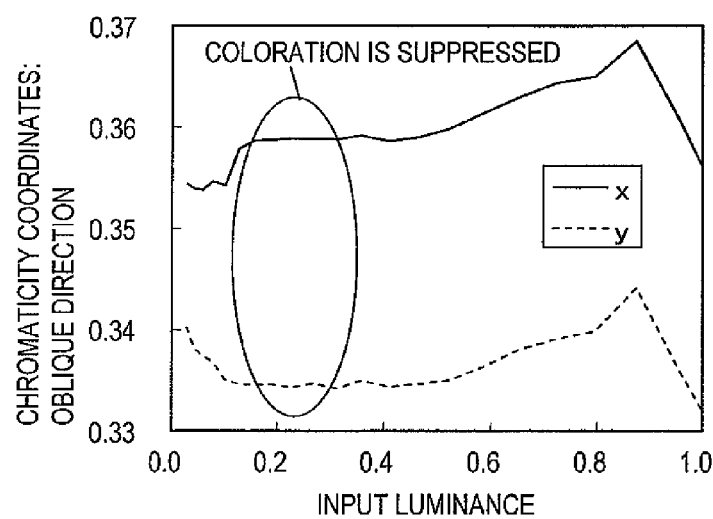
FIG. 32 A graph showing a relationship between the input luminance when a signal conversion as shown in FIG. 30 is performed and the chromaticity coordinates (x, y) of a gray representation when viewed from a 60° oblique direction.
Figure 33:
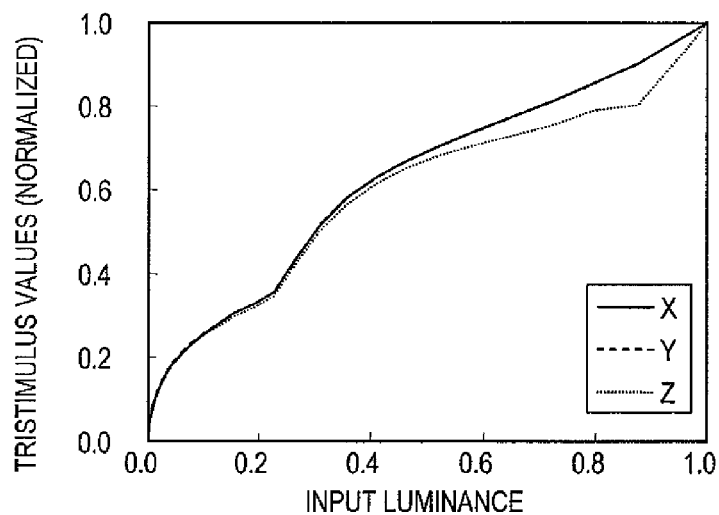
FIG. 33 A graph showing a relationship between the input luminance when a signal conversion as shown in FIG. 30 is performed and the tristimulus values X, Y, and Z of a gray representation when viewed from a 60° oblique direction.

FIG. 31 shows a relationship between the input luminance when a signal conversion as shown in FIG. 30 is performed and the chromaticity coordinates (x, y) of a gray representation when viewed from the frontal direction. FIG. 32 shows a relationship between the input luminance in this case and the chromaticity coordinates (x, y) of a gray representation when viewed from a 60° oblique direction. Furthermore, FIG. 33 shows a relationship between the input luminance in this case and the tristimulus values X, Y, and Z of a gray representation when viewed from a 60° oblique direction.

As shown in FIG. 31, the chromaticity in the frontal direction is essentially the same regardless of the input luminance. As for the 60° oblique direction, as shown in FIG. 32, the change in chromaticity near the input luminance of 0.25 is suppressed, and the coloration of a gray representation is suppressed. This is because, as shown in FIG. 33, the tristimulus values X, Y, and Z are essentially equal near the input luminance of 0.25.

The example shown in FIG. 30 illustrates that the output luminances of some subpixels (specifically, the red subpixel R, the green subpixel G, and the yellow subpixel Ye) are not of a monotonously increasing relationship with input luminance; however, the output luminances of all subpixels may be of a monotonously increasing relationship with input luminance. As in the example shown in FIG. 30, when the output luminance of at least one subpixel is not of a monotonously increasing relationship with input luminance, a high effect of suppressing coloration of a gray representation is obtained.

Although the output luminance of the red subpixel R is the highest in the input luminance range of no less than 0.15 and no more than 0.35 in the example shown in FIG. 30, it may be the output luminance of the green subpixel that is the highest.

Next, an example of a more specific construction of the signal conversion circuit 20 will be described.

For example, the signal conversion circuit 20 may include a look-up table which contains data indicating subpixel luminances corresponding to colors to be identified by a video signal (three-dimensional signal), thus being able to generate a multiprimary signal by referring to this look-up table in accordance with the input video signal. However, if data representing subpixel luminances concerning all colors is included in the look-up table, the look-up table will have a large data amount, thus making it difficult to simply construct a look-up table by using an inexpensive memory with a small capacity.

Figure 34:
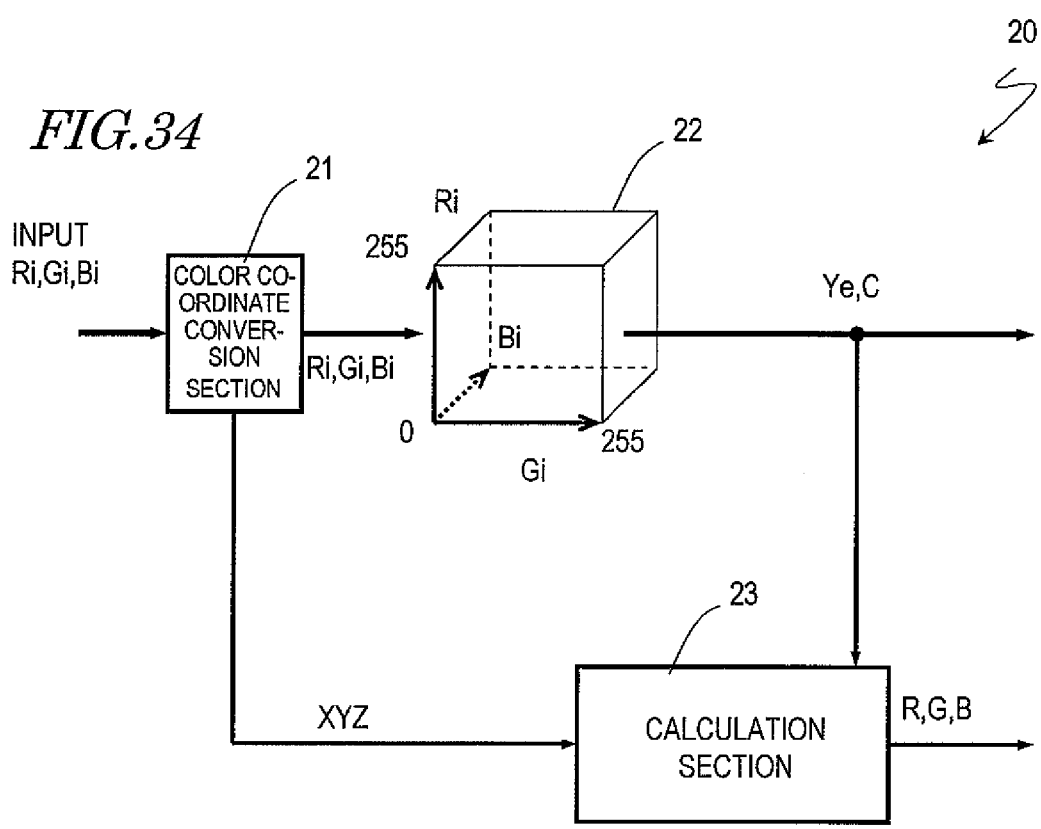
FIG. 34 A block diagram showing a preferable exemplary construction for the signal conversion circuit of the liquid crystal display device 100.

FIG. 34 shows an example of a preferable construction of the signal conversion circuit 20. The signal conversion circuit 20 shown in FIG. 34 includes a color coordinate conversion section 21, a look-up table memory 22, and a calculation section 23.

The color coordinate conversion section 21 receives a video signal representing the luminance of three primaries, and converts color coordinates in the RGB color space to color coordinates in the XYZ color space. Specifically, as shown in eq. (1) below, the color coordinate conversion section 21 performs a matrix conversion to an RGB signal (which contains components Ri, Gi, Bi corresponding to the respective luminances of red, green, blue) to obtain XYZ values. The matrix of 3 rows by 3 columns which is exemplified in eq. (1) is defined based on the BT.709 standard.

[math. 1]

$$\begin{pmatrix} X \\ Y \\ Z \end{pmatrix} = \begin{pmatrix} 0.4124 & 0.3576 & 0.1804 \\ 0.2127 & 0.7152 & 0.0722 \\ 0.0193 & 0.1192 & 0.9502 \end{pmatrix} \begin{pmatrix} Ri \\ Gi \\ Bi \end{pmatrix} \quad (1)$$

A look-up table is stored in the look-up table memory 22. This look-up table includes data representing the luminances of a yellow subpixel Ye and a cyan subpixel C corresponding to the luminances Ri, Gi, Bi of the three primaries indicated by the video signal. Note that, herein, the luminances Ri, Gi, Bi are obtained by applying an inverse γ correction to gray scale values which are expressed in 256 gray scale levels, and the number of colors that are identifiable by the video signal is 256×256×256. On the other hand, the look-up table in the look-up table memory 22 includes data of a 256×256×256 three-dimensional matrix structure corresponding to the number of colors that are identifiable by the video signal. By referring to the look-up table in the look-up table memory 22, luminances of the yellow subpixel Ye and the cyan subpixel C corresponding to the luminances Ri, Gi, Bi can be obtained.

The calculation section 23 performs a calculation using the XYZ values obtained by the color coordinate conversion section 21 and the luminances of the yellow subpixel Ye and the cyan subpixel C obtained from the look-up table memory 22, thus calculating luminances of the red subpixel R, the green subpixel G, and the blue subpixel B. Specifically, the calculation section 23 performs the calculation according to eq. (2) below.

[math. 2]

$$\begin{pmatrix} R \\ G \\ B \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X - (X_{Ye} \times Ye + X_C \times C) \\ Y - (Y_{Ye} \times Ye + Y_C \times C) \\ Z - (Z_{Ye} \times Ye + Z_C \times C) \end{pmatrix} \quad (2)$$

Hereinafter, the reason why the luminances of the red subpixel R, the green subpixel G, and the blue subpixel B are calculated by performing the calculation shown in eq. (2) will be described with reference to eqs. (3) and (4) below.

[math. 3]

$$\begin{pmatrix} X \\ Y \\ Z \end{pmatrix} = \begin{pmatrix} X_R & X_G & X_B & X_{Ye} & X_C \\ Y_R & Y_G & Y_B & Y_{Ye} & Y_C \\ Z_R & Z_G & Z_B & Z_{Ye} & Z_C \end{pmatrix} \begin{pmatrix} R \\ G \\ B \\ Ye \\ C \end{pmatrix} \quad (3)$$

[math. 4]

$$\begin{pmatrix} X \\ Y \\ Z \end{pmatrix} = \begin{pmatrix} X_R & X_G & X_B \\ Y_R & Y_G & Y_B \\ Z_R & Z_G & Z_B \end{pmatrix} \begin{pmatrix} R \\ G \\ B \end{pmatrix} + \begin{pmatrix} X_{Ye} & X_C \\ Y_{Ye} & Y_C \\ Z_{Ye} & Z_C \end{pmatrix} \begin{pmatrix} Ye \\ C \end{pmatrix} \quad (4)$$

Assuming that the color that is identified by a video signal which is input to the signal conversion circuit is identical to the color that is identified by a multiprimary signal which is output from the signal conversion circuit 20, the XYZ values which are obtained by converting the luminances Ri, Bi, Gi of the three primaries are also expressed by the matrix conversion equation for the luminances of the red subpixel R, the green subpixel G, the blue subpixel B, the yellow subpixel Ye, and the cyan subpixel C, as shown by eq. (3). Coefficients $X_R$, $Y_R$, $Z_R$ ... $Z_C$ of the conversion matrix of 3 rows by 5 columns shown in eq. (3) are determined based on the XYZ values of the respective subpixels of the liquid crystal display panel 10.

The right-hand side of eq. (3) can be transformed into a sum of a product of multiplying the luminances of the red subpixel R, the green subpixel G, and the blue subpixel B (denoted as R, G, B in the equation) by a conversion matrix of 3 rows by 3 columns and a product of multiplying the luminances of the yellow subpixel Ye and the cyan subpixel C (denoted as Ye, C in the equation) by a conversion matrix of rows by 2 columns, as shown in eq. (4). By further transforming eq. (4), eq. (2) is obtained. Therefore, by performing a calculation in accordance with eq. (2), the luminances of the red subpixel R, the green subpixel G, and the blue subpixel B can be calculated.

Thus, the calculation section 23 is able to obtain luminances of the red subpixel R, the green subpixel G, and the blue subpixel B based on the XYZ values obtained by the color coordinate conversion section 21 and the luminances of the yellow subpixel Ye and the cyan subpixel C obtained from the look-up table memory 22.

As described above, in the signal conversion circuit 20 shown in FIG. 34, the luminance of two subpixels are first determined by using a look-up table which is stored in the look-up table memory 22, and thereafter the luminances of the other three subpixels are determined by the calculation section 23. Therefore, the look-up table to be stored in the look-up table memory 22 does not need to contain data indicating the luminances of all five subpixels, but may only contain data indicating the luminances of two subpixels among the five subpixels. Thus, by adopting the construction as shown in FIG. 34, it is possible to simply construct a look-up table by using an inexpensive memory with a small capacity.

Figure 35:
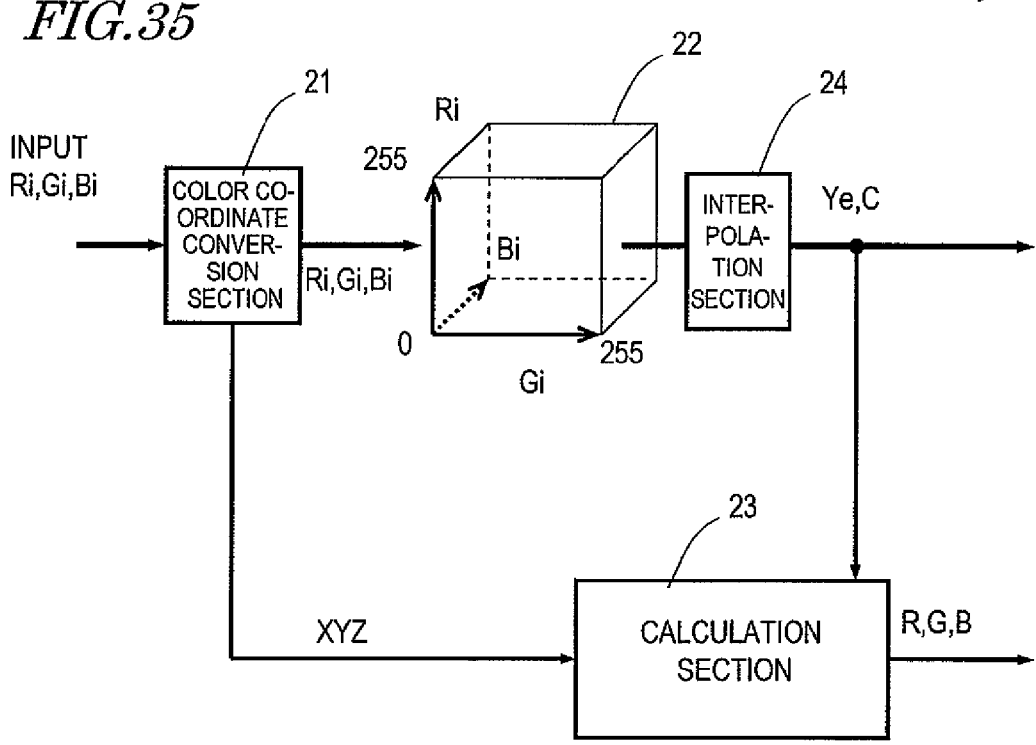
FIG. 35 A block diagram showing another preferable exemplary construction for the signal conversion circuit of the liquid crystal display device 100.

FIG. 35 shows another example of a preferable construction for the signal conversion circuit 20. The signal conversion circuit 20 shown in FIG. 35 differs from the signal conversion circuit 20 shown in FIG. 34 in that it further includes an interpolation section 24 in addition to the color coordinate conversion section 21, the look-up table memory 22, and the calculation section 23.

Moreover, in the signal conversion circuit 20 shown in FIG. 34, the data of the look-up table stored in the look-up table memory 22 corresponds to the same number of colors as the number of colors identified by the video signal, whereas in the signal conversion circuit 20 shown in FIG. 35, the data in the look-up table corresponds to a smaller number of color than the number of colors identified by the video signal.

Herein, the luminances Ri, Gi, Bi of the three primaries indicated by the video signal each have 256 gray scale levels, and the number of colors identified by the video signal is 256×256×256. On the other hand, the look-up table in the look-up table memory 22 includes data of a 17×17×17 three-dimensional matrix structure corresponding to gray scale levels that are 16 levels apart, e.g., 0, 16, 32, . . . , 256 gray scale levels, for each of the luminances Ri, Gi, Bi. That is, the look-up table includes 17×17×17 data as obtained by thinning out the 256×256×256.

By using the data (luminances of the yellow subpixel Ye and the cyan subpixel C) contained in the look-up table, the interpolation section 24 interpolates between the luminances of the yellow subpixel Ye and the cyan subpixel C that correspond to the gray scale levels which have been lost through thinning out. The interpolation section 24 performs interpolation via linear approximation, for example. In this manner, the luminances of the yellow subpixel Ye and the cyan subpixel C corresponding to the luminances Ri, Gi, Bi of the three primaries can be obtained for all gray scale levels.

By using the XYZ values obtained by the color coordinate conversion section 21 and the luminances of the yellow subpixel Ye and the cyan subpixel C obtained by the look-up table memory 22 and the interpolation section 24, the calculation section 23 calculates the luminances of the red subpixel R, the green subpixel G, and the blue subpixel B.

As described above, in the signal conversion circuit 20 shown in FIG. 35, there are fewer colors corresponding to the data in the look-up table stored in the look-up table memory 22 than the number of colors identified by the video signal. Therefore, the data amount in the look-up table can be further reduced.

The above description illustrates an example where data indicating the luminances of the yellow subpixel Ye and the cyan subpixel C is contained in a look-up table and the calculation section 23 calculates the luminances of the remaining red subpixel R, green subpixel G, and blue subpixel B. However, the present invention is not limited thereto. By including data indicating the luminances of any two arbitrary subpixels in the look-up table, it becomes possible to calculate the luminances of the other three subpixels with the calculation section 23.

Moreover, also in the case where the number of subpixels defining each pixel is not five as illustrated, a similar technique can be used to reduce the data amount in the look-up table. Given that the number of primary colors used for displaying is n, by referring to a look-up table, the signal conversion circuit 20 may acquire the luminances of (n−3) primary colors among the n primary colors (i.e., luminance data concerning (n−3) primary colors is included in the look-up table), and the luminances of the remaining three primary colors among the n primary colors may be calculated through a calculation using the luminances of the (n−3) primary colors.

For example, in the case where one pixel is defined by four subpixels, the signal conversion circuit 20 may acquire the luminance of one subpixel by referring to a look-up table, and the luminances of the remaining three subpixels may be calculated through a calculation by the calculation section 23. The four subpixels may be, for example, a red subpixel, a green subpixel, a blue subpixel, and a yellow subpixel.

Moreover, in the case where one pixel is defined by six subpixels, the luminances of three subpixels may be acquired by referring to a look-up table, and the luminances of the remaining three subpixels may be calculated by the calculation section 23. The six subpixels may be, for example, a red subpixel, a green subpixel, a blue subpixel, a yellow subpixel, a cyan subpixel, and a magenta subpixel.

The constituent elements in the signal conversion circuit 20 can be implemented in hardware, or some of all of them may be implemented in software. In the case where these constituent elements are implemented in software, they may be constructed by using a computer, this computer having a CPU (Central Processing Unit) for executing various programs, a RAM (Random Access Memory) functioning as a work area for executing such programs, and the like. Then, programs for realizing the functions of the respective constituent elements are executed in the computer, thus allowing the computer to operate as the respective constituent elements.

Moreover, the programs may be supplied from a storage medium to the computer, or supplied to the computer via a communications network. The storage medium may be constructed so as to be removable from the computer, or may be incorporated into the computer. This storage medium may be mounted to the computer so that the computer can directly read the program code recorded thereon, or mounted so that the program code is read via a program reading device which is connected to the computer as an external storage device. The followings can be used as the storage medium, for example: a tape such as a magnetic tape or a cassette tape; a disk including a magnetic disk such as a flexible disk/hard disk, a magneto-optical disk such as an MO or an MD, and an optical disk such as a CD-ROM, a DVD, or a CD-R; a card such as an IC card (including memory cards) or an optical card; or a semiconductor memory such as a mask ROM, an EPROM (Erasable Programmable Read Only Memory), an EEPROM (Electrically Erasable Programmable Read Only Memory), or a flash ROM. Moreover, in the case where a program is supplied via a communications network, the program may be in the form of a carrier wave or a data signal such that its program code is embodied through an electronic transmission.

Next, a specific example of the construction of the liquid crystal display panel 10 will be described.

First, the fundamental construction of the MVA-mode liquid crystal display panel 10 will be described with reference to FIGS. 36(a) to (c).

Each subpixel of liquid crystal display panels 10A, 10B, and 10C includes a first electrode 1, a second electrode 2 opposing the first electrode 1, and a vertical-alignment type liquid crystal layer 3 provided between the first electrode 1 and the second electrode 2. In the vertical-alignment type liquid crystal layer 3, under no applied voltage, liquid crystal molecules 3a having a negative dielectric anisotropy are aligned substantially perpendicular (e.g., no less than 87° and no more than 90°) to the planes of the first electrode 1 and the second electrode 2. Typically, it is obtained by providing a vertical alignment film (not shown) on a surface, on the liquid crystal layer 3 side, of each of the first electrode 1 and the second electrode 2.

On the first electrode 1 side of the liquid crystal layer 3, first alignment regulating means (31, 41, 51) are provided. On the second electrode 2 side of the liquid crystal layer 3, second alignment regulating means (32, 42, 52) are provided. In a liquid crystal region which is defined between a first alignment regulating means and a second alignment regulating means, liquid crystal molecules 3$a$ are subject to alignment regulating forces from the first alignment regulating means and the second alignment regulating means, and when a voltage is applied between the first electrode 1 and the second electrode 2, they fall (tilt) in a direction shown by arrows in the figure. That is, since the liquid crystal molecules 3$a$ will fall in a uniform direction within each liquid crystal region, each liquid crystal region can be regarded as a domain.

Figure 36:
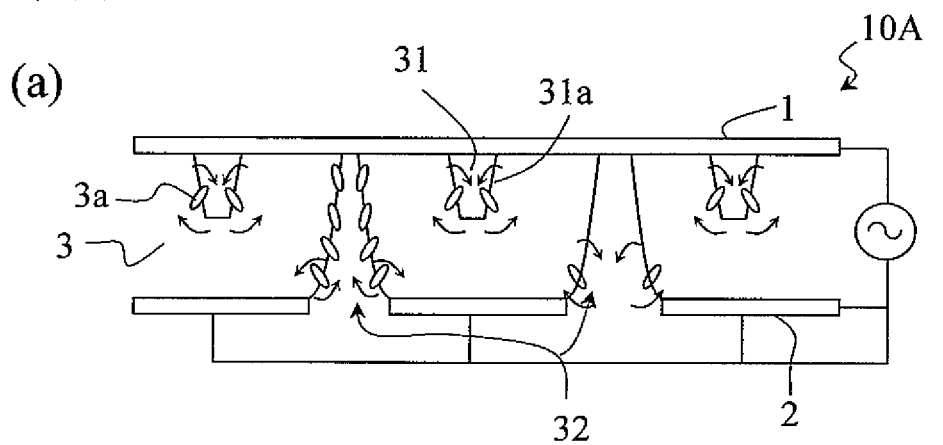
FIG. 36 (a) to (a) are diagrams for describing the fundamental construction of a liquid crystal display panel of the MVA mode.
Figure 36:
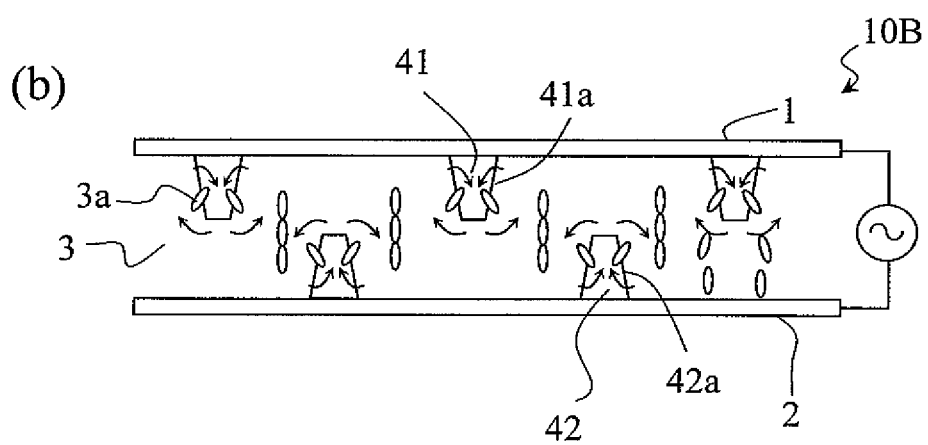
Figure 36:
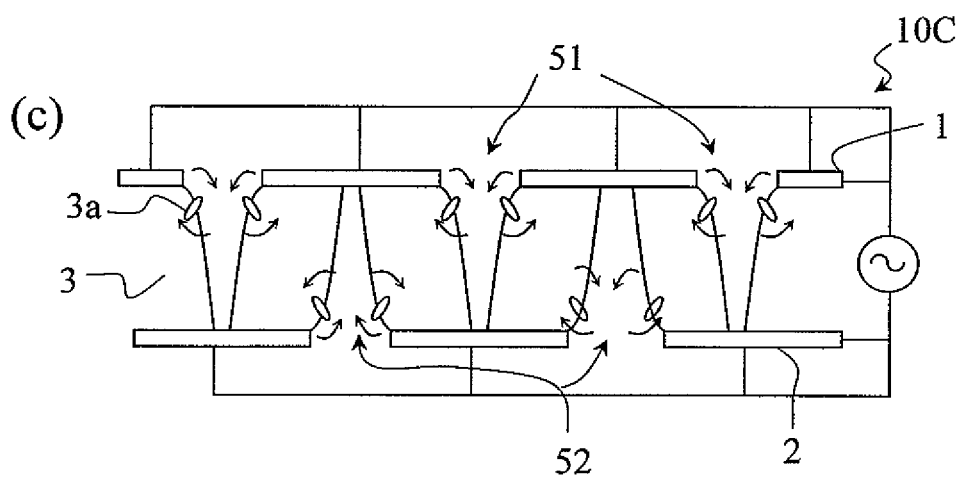

Within each subpixel, the first alignment regulating means and second alignment regulating means (which may be collectively referred to as "alignment regulating means") are each provided in a stripe shape; FIGS. 36($a$) to ($c$) are cross-sectional views along a direction which is orthogonal to the direction that the stripe-shaped alignment regulating means extend. On both sides of each alignment regulating means, liquid crystal regions (domains) are formed in which the liquid crystal molecules 3$a$ fall in directions which are 180° apart. As the alignment regulating means, various alignment regulating means (domain restriction means) as disclosed in Patent Document 2 can be used.

The liquid crystal display panel 10A shown in FIG. 36($a$) includes ribs (protrusions) 31 as the first alignment regulating means, and slits (portions where the electrically-conductive film is absent) 32 provided in the second electrode 2 as the second alignment regulating means. The ribs 31 and the slits 32 are each provided in a stripe shape (strip shape). The ribs 31 cause the liquid crystal molecules 3$a$ to be oriented substantially perpendicular to the side faces 31$a$ thereof, so that the liquid crystal molecules 3$a$ are oriented in a direction which is orthogonal to the extending direction of the ribs 31. When a potential difference is created between the first electrode 1 and the second electrode 2, each slit 32 generates an oblique field in the liquid crystal layer 3 near the edges of the slit 32, thus causing the liquid crystal molecules 3$a$ to be oriented in a direction which is orthogonal to the extending direction of the slits 32. The ribs 31 and the slits 32 are disposed parallel to one another, with a constant interval therebetween, so that a liquid crystal region (domain) is formed between every adjoining rib 31 and slit 32.

The liquid crystal display panel 10B shown in FIG. 36($b$) differs from the liquid crystal display panel 10A of FIG. 36($a$) in that ribs (first ribs) 41 and ribs (second ribs) 42 are provided as the first alignment regulating means and the second alignment regulating means, respectively. The ribs 41 and the ribs 42 are disposed parallel to one another, with a constant interval therebetween, so that, by causing the liquid crystal molecules 3$a$ to be oriented substantially perpendicular to side faces 41$a$ of the ribs 41 and side faces 42$a$ of the ribs 42, liquid crystal regions (domains) are formed therebetween.

The liquid crystal display panel 10C shown in FIG. 36($c$) differs from the liquid crystal display panel 10A of FIG. 36($a$) in that slits (first slits) 51 and slits (second slits) 52 are provided as the first alignment regulating means and the second alignment regulating means, respectively. When a potential difference is created between the first electrode 1 and the second electrode 2, a slit 51 and a slit 52 generate an oblique field in the liquid crystal layer 3 near the edges of the slits 51 and 52, thus causing the liquid crystal molecules 3$a$ to be oriented in a direction which is orthogonal to the extending direction of the slits 51 and 52. The slits 51 and the slits 52 are disposed parallel to one another, with a constant interval therebetween, so that liquid crystal regions (domains) are formed therebetween.

In the liquid crystal display panels 10A, 10B, and 10C of the above-described constructions, when a predetermined voltage is applied across the liquid crystal layer 3, a plurality of regions (domains) with different azimuth directions for liquid crystal molecules 3$a$ to be tilted are created within each subpixel, whereby displaying with a wide viewing angle is realized. As the first alignment regulating means and the second alignment regulating means, ribs or slits can be used in any arbitrary combination. The first electrode 1 and the second electrode 2 may be any electrodes that oppose each other via the liquid crystal layer 3; typically, one of them is a counter electrode, whereas the other is a pixel electrode. Adopting the construction of the liquid crystal display panel 10A shown in FIG. 36($a$) provides an advantage in that the increase in the number of production steps can be minimized. Providing slits in the pixel electrode does not require any steps. On the other hand, as for the counter electrode, providing ribs will induce a small increase in the number of steps than providing slits. It will be appreciated that a construction in which only ribs are employed as the alignment regulating means, or a construction in which only slits are employed, may be adopted.

Although the MVA mode has been described, a CPA-mode liquid crystal display panel 10 may also be used. In a pixel electrode of a CPA-mode liquid crystal display panel 10, at least one aperture and/or recess is formed at a predetermined position, and a plurality of liquid crystal domains each exhibiting an axisymmetric alignment (radially-inclined alignment) are created under an applied voltage, within the subpixel. In each liquid crystal domain, the liquid crystal molecules tilt in essentially all azimuth directions. That is, in the CPA mode, numerous regions are formed whose liquid crystal molecules tilt in respectively different azimuth directions. Therefore, displaying with a wide viewing angle is realized.

Figure 37:
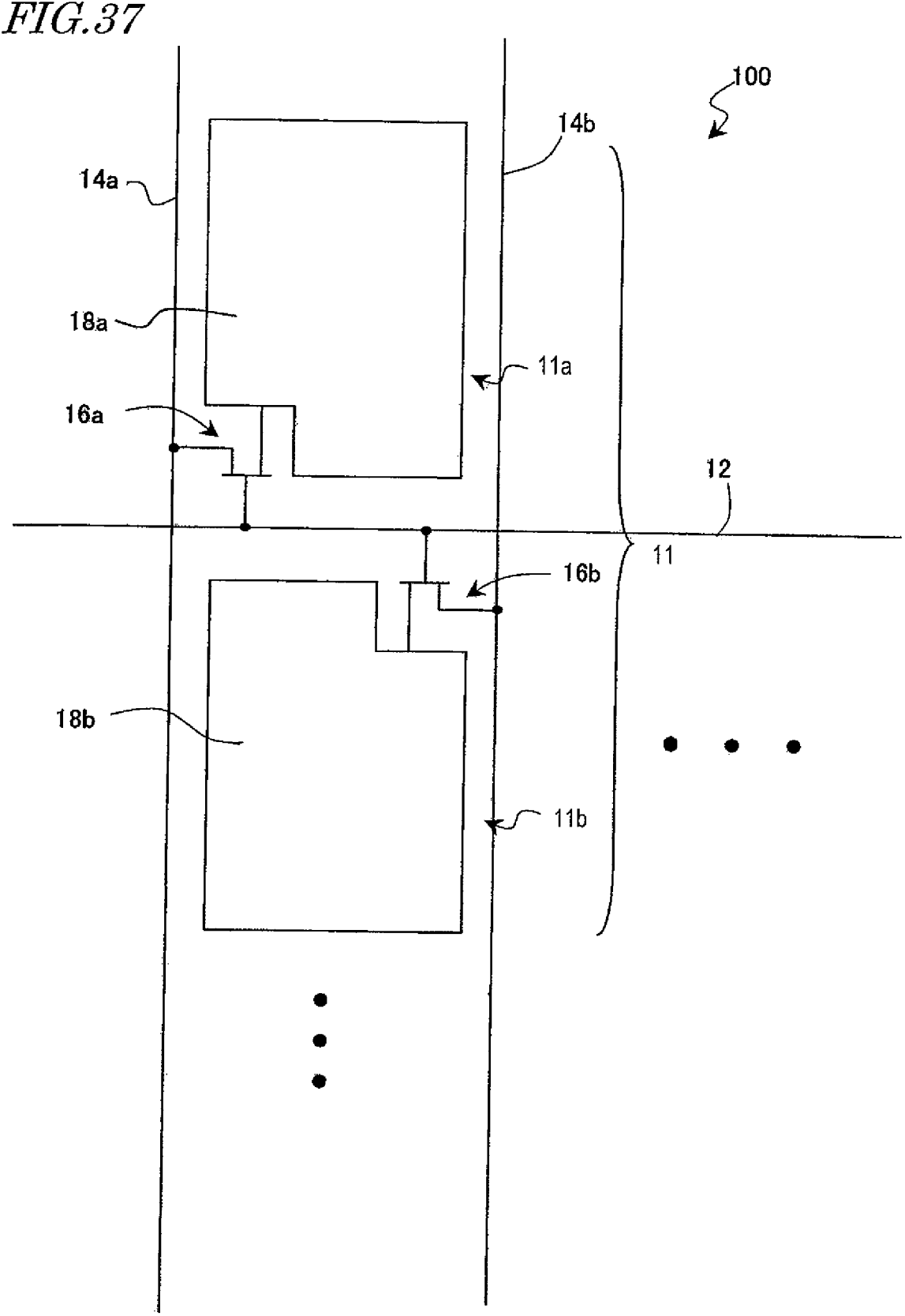
FIG. 37 A diagram showing a specific exemplary construction of each subpixel for performing multi-pixel driving.

Next, a specific construction for performing multi-pixel driving will be described. FIG. 37 shows a specific example of the construction of each subpixel 11. As shown in FIG. 37, each subpixel 11 includes a first region 11$a$ and a second region 11$b$ which are capable of exhibiting different luminances from each other. In other words, when displaying a certain gray scale level, each subpixel 11 can be driven so that different effective voltages are applied across the respective liquid crystal layers in the first region 11$a$ and the second region 11$b$. Note that the number of regions included in one subpixel 11 (which may also be referred to as the number of divisions in the subpixel 11) is not limited to two. For example, a third region (not shown) which is capable of applying a different voltage from those of the first region 11$a$ and the second region 11$b$ may further be provided.

Thus, when the subpixel 11 is divided into a plurality of regions 11$a$ and 11$b$ capable of exhibiting different luminances from each other, different characteristics will be mixedly observed, thereby alleviating the viewing angle dependence of the γ characteristics (i.e., a problem in that the γ characteristics when observed from the front may differ from the γ characteristics when observed obliquely). The γ characteristics are the gray scale dependence of display luminance.

If the γ characteristics differ between the frontal direction and the oblique direction, the state of gray scale displaying will differ depending on the direction of observation.

Various constructions are possible as the construction for applying different levels of effective voltages across the liquid crystal layers in the first region 11a and the second region 11b, as is disclosed in Patent Documents 4 and 5, and the like.

For example, a construction shown in FIG. 37 may be adopted. In a generic liquid crystal display device that does not perform multi-pixel driving, one subpixel has only one pixel electrode, which is connected to a signal line via a switching element (e.g., a TFT). On the other hand, the subpixel 11 shown in FIG. 37 includes two subordinate pixel electrodes 18a and 18b that are connected to respectively different signal lines 14a and 14b via corresponding TFTs 16a and 16b, respectively.

Since the first region 11a and the second region 11b constitute one subpixel 11, the gates of the TFTs 16a and 16b are connected to a common scanning line (gate line) 12, and are ON/OFF controlled with the same scanning signal. To the signal lines (source lines) 14a and 14b, signal voltages (gray scale voltages) are supplied such that the first region 11a and the second region 11b will have different luminances. The signal voltages to be supplied to the signal lines 14a and 14b are adjusted so that an average luminance of the first region 11a and the second region 11b is equal to the subpixel luminance (output luminance) which is indicated by a multiprimary signal that is output from the signal conversion circuit 20.

Figure 38:
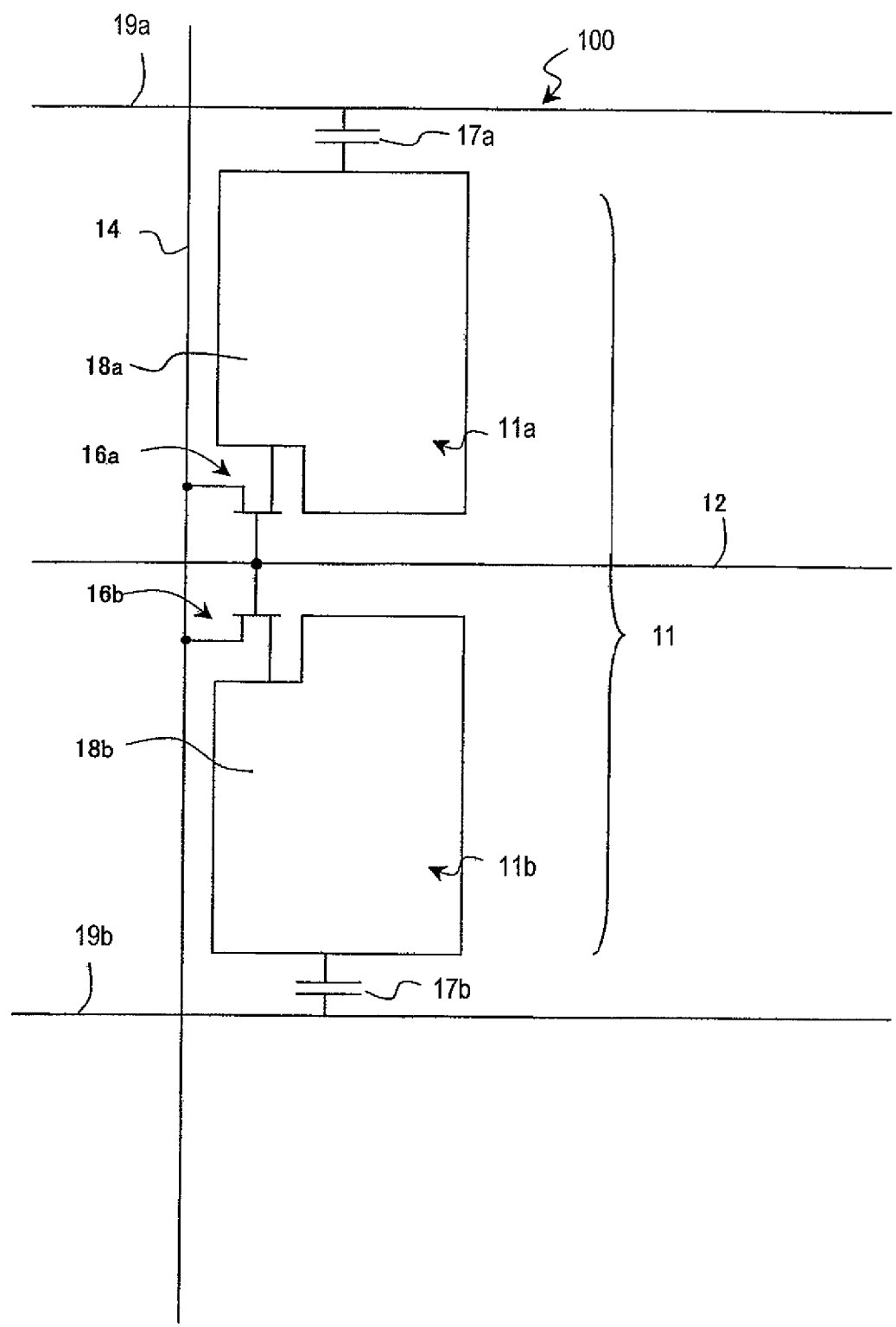
FIG. 38 A diagram showing a specific example of the construction of each subpixel for performing multi-pixel driving.

Alternatively, a construction shown in FIG. 38 may be adopted. In the construction shown in FIG. 38, the source electrodes of a TFT 16a and a TFT 16b are connected to a common (same) signal line 14. In the first region 11a and the second region 11b, storage capacitors (CS) 17a and 17b are provided, respectively. The storage capacitors 17a and 17b are respectively connected to storage capacitor lines (CS lines) 19a and 19b. The storage capacitors 17a and 17b are formed of storage capacitor electrodes which are electrically connected respectively to subordinate pixel electrodes 18a and 18b, storage capacitor counter electrodes which are electrically connected to the storage capacitor lines 19a and 19b, and an insulating layer provided therebetween (none of which is shown). The storage capacitor counter electrodes of the storage capacitors 17a and 17b are independent of each other, and are structured so that respectively different voltages (called storage-capacitor counter voltages) can be supplied thereto from the storage capacitor lines 19a and 19b, respectively. By varying the storage-capacitor counter voltages that are supplied to the storage capacitor counter electrodes, a difference can be introduced between the effective voltages to be applied across the liquid crystal layer in the first region 11a and the liquid crystal layer in the second region 11b, based on capacitor splitting.

In the construction shown in FIG. 37, the TFTs 16a and 16b, which are independent of each other, are connected to the first region 11a and the second region 11b, such that the source electrodes of the TFTs 16a and 16b are respectively connected to the corresponding signal lines 14a and 14b. Although this makes it possible to apply arbitrary effective voltages across the liquid crystal layers in the plurality of regions 11a ands 11b, the number of signal lines (14a, 14b) is twice the number of signal lines in a liquid crystal display device which does not perform multi-pixel driving, thus requiring twice as many signal line driving circuits.

On the other hand, in the construction shown in FIG. 38, there is no need to apply different signal voltages to the subordinate pixel electrodes 18a and 18b, so that the TFTs 16a and 16b may be connected to the common signal line 14, and the same signal voltage may be supplied thereto. Thus, the number of signal lines 14 is the same as that of a liquid crystal display device which does not perform multi-pixel driving, and it is possible to adopt the same signal line driving circuit construction that is used in a liquid crystal display device which does not perform multi-pixel driving.

Figure 39:
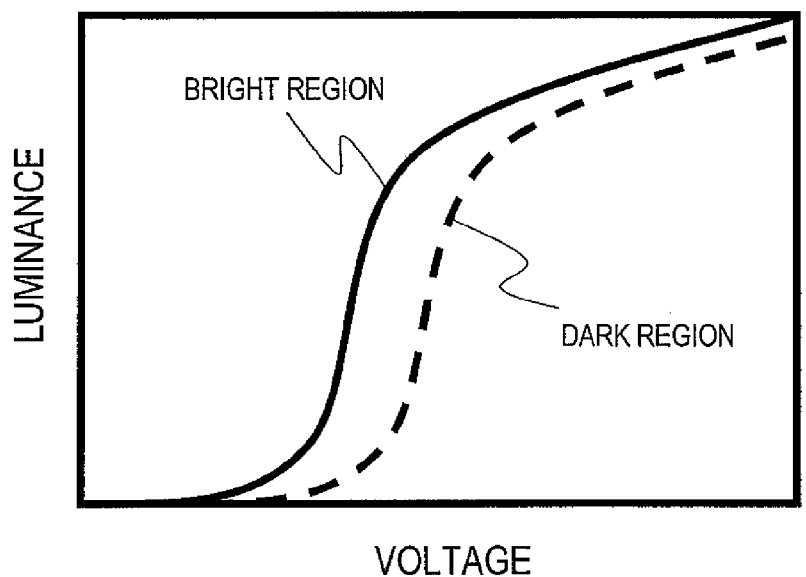
FIG. 39 A graph showing a relationship between the luminances exhibited by a first region and a second region (a bright region and a dark region) of each subpixel and the voltage.
Figure 40:
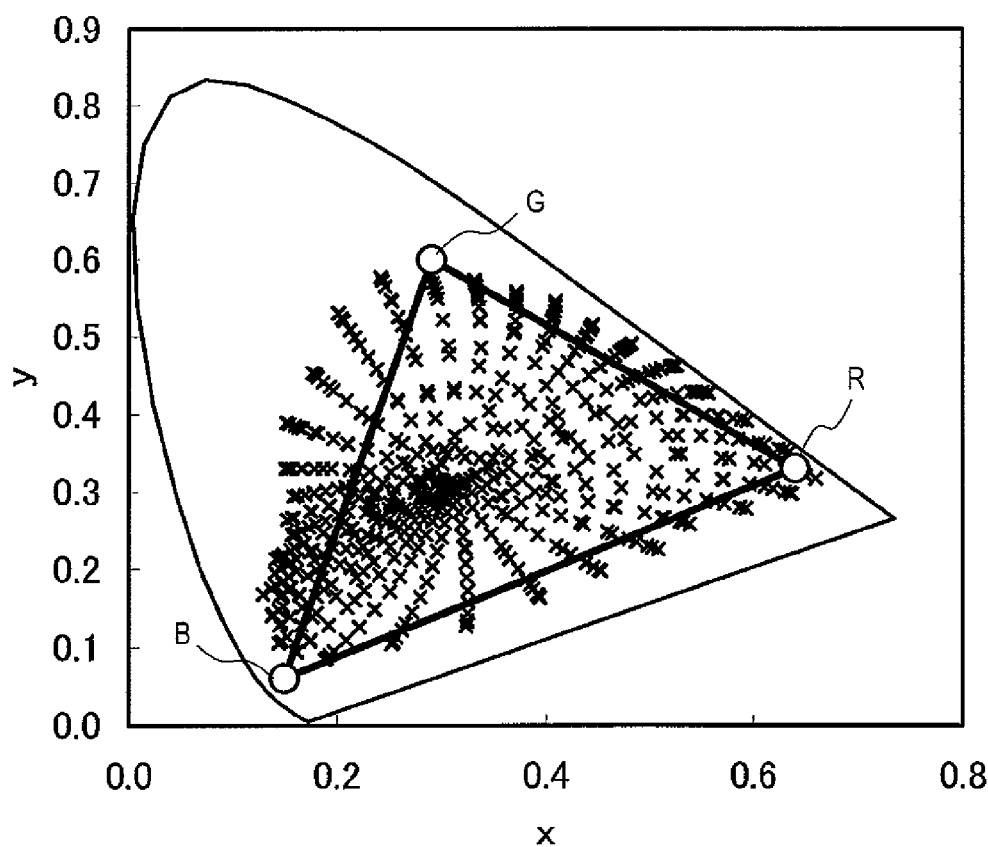
FIG. 40 An xy chromaticity diagram showing the color gamut of a three-primary LCD.
Figure 41:
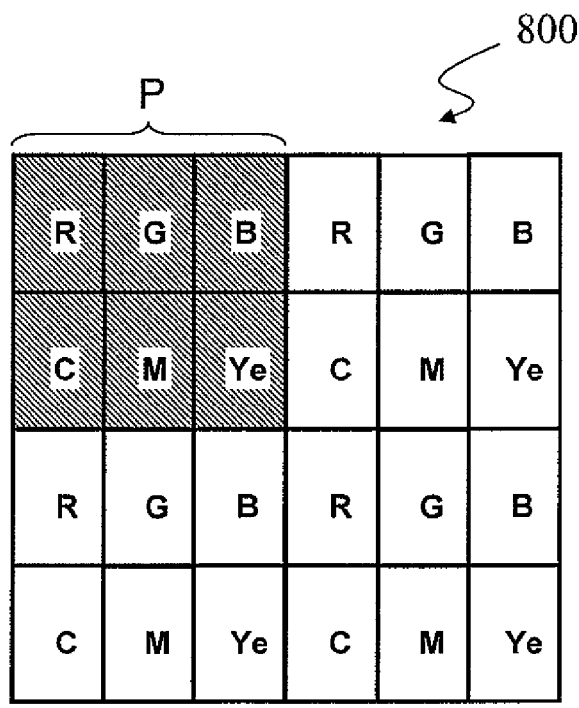
FIG. 41 A diagram schematically showing a conventional multiprimary LCD 800.
Figure 42:
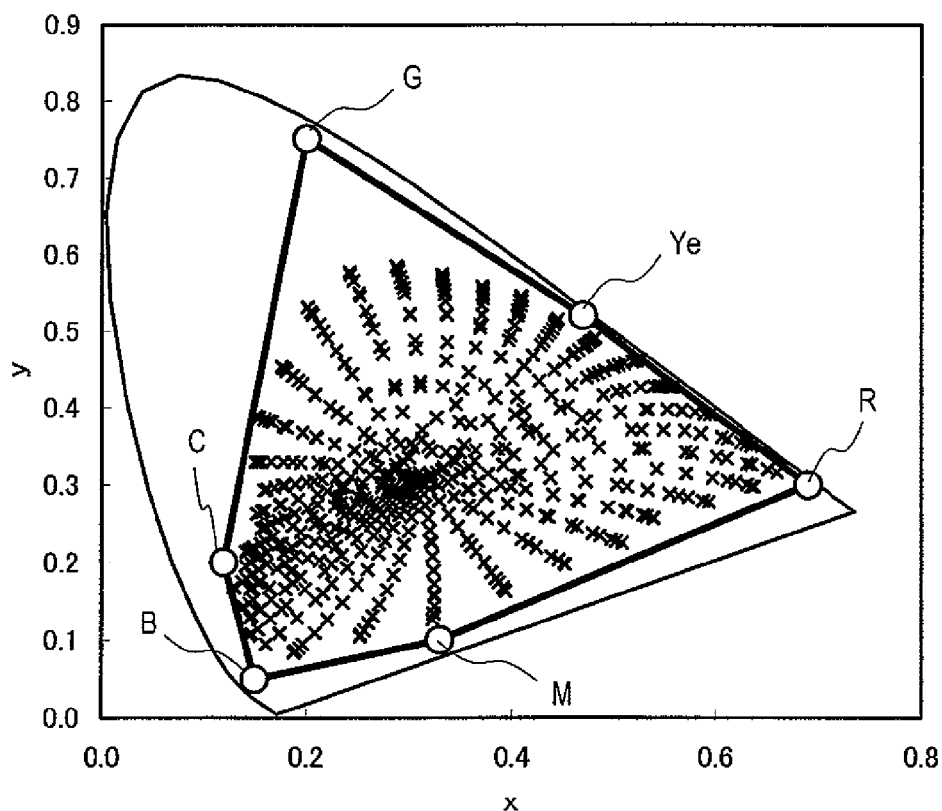
FIG. 42 An xy chromaticity diagram showing the color gamut of the multiprimary LCD 800.

A relationship between the luminances exhibited by the first region 11a and the second region 11b and voltage (the signal voltages supplied to the subordinate pixel electrodes 18a and 18b) in the case of adopting the construction of FIG. 38 is shown in FIG. 39. As shown in FIG. 39, in spite of the fact that the same voltage is supplied, one region exhibits a higher luminance than does the other region. The region exhibiting a relatively high luminance is referred to as a "bright region", and the region exhibiting a relatively low luminance is referred to as a "dark region". Thus, by allowing a bright region and a dark region to be mixedly present within the subpixel 11, the viewing angle dependence of the γ characteristics is reduced.

INDUSTRIAL APPLICABILITY

According to the present invention, there is provided a multiprimary liquid crystal display device in which deteriorations in display quality caused by the coloration of a gray representation when viewed from an oblique direction are suppressed. According to the present invention, there is also provided a signal conversion circuit for use in such a multiprimary liquid crystal display device. A multiprimary liquid crystal display device according to the present invention is capable of performing high-quality display, and therefore is suitably used for various electronic devices such as liquid crystal television sets.

REFERENCE SIGNS LIST 10 liquid crystal display panel
20 signal conversion circuit
21 color coordinate conversion section
22 look-up table memory
23 calculation section
24 interpolation section
100 liquid crystal display device

The invention claimed is:

1. A signal conversion circuit for use in a multiprimary liquid crystal display device, the multiprimary liquid crystal display device having a pixel defined by a plurality of subpixels including a red subpixel, a green subpixel, a blue subpixel, and a yellow subpixel, and performing multicolor display by using four or more primary colors to be displayed by the plurality of subpixels, the signal conversion circuit converting an input video signal to a multiprimary signal corresponding to four or more primary colors, wherein, when any of a plurality of video signals for the pixel to display a gray color having a normalized luminance of no less than 0.2 and no more than 0.3 is input, the signal conversion circuit converts the plurality of video signals so that, among normalized luminances of the plurality of subpixels, the yellow subpixel has the lowest normalized luminance; and when at least one of the plurality of video signals for the pixel to display a gray color, which is an achromatic color of an intermediate gray scale and has an arbitrary normalized luminance of more than zero, is input, a normalized luminance of each of the plurality of subpixels is greater than zero, and the normalized luminance of the yellow subpixel is lower than a normalized luminance of any other one of the plurality of subpixels.

2. A signal conversion circuit for use in a multiprimary liquid crystal display device, the multiprimary liquid crystal display device having a pixel defined by a plurality of subpixels including a red subpixel, a green subpixel, a blue subpixel, and a yellow subpixel, and performing multicolor display by using four or more primary colors to be displayed by the plurality of subpixels, the signal conversion circuit converting an input video signal to a multiprimary signal corresponding to four or more primary colors, wherein,
when any of a plurality of video signals for the pixel to display a gray color, which is an achromatic color of an intermediate gray scale and has a normalized luminance of no less than 0.15 and no more than 0.35, is input, the signal conversion circuit performs a conversion of the plurality of video signals so that, among the normalized luminances of the plurality of subpixels, the yellow subpixel has the lowest normalized luminance; and
when at least one of the plurality of video signals for the pixel to display the gray color having an arbitrary normalized luminance of more than zero is input, a normalized luminance of each of the plurality of subpixels is greater than zero, and the normalized luminance of the yellow subpixel is lower than a normalized luminance of any other one of the plurality of subpixels.

3. The signal conversion circuit of claim 1, wherein, when a the plurality of video signals for the pixel to display a gray color having a normalized luminance of no less than 0.2 and no more than 0.3 is input, the signal conversion circuit performs a conversion of the plurality of video signals so that, among the normalized luminances of the plurality of subpixels, the normalized luminance of the blue subpixel is the lowest next to the normalized luminance of the yellow subpixel.

4. The signal conversion circuit of claim 1, wherein the plurality of subpixels further includes a cyan subpixel.

5. The signal conversion circuit of claim 1, wherein, when the plurality of video signals for the pixel to display a gray color having a normalized luminance of no less than 0.2 and no more than 0.3 is input, the signal conversion circuit performs a conversion of the plurality of video signals so that, among the normalized luminances of the plurality of subpixels, the normalized luminance of the green subpixel is the highest.

6. The signal conversion circuit of claim 1, wherein, when the plurality of video signals for the pixel to display a gray color having a normalized luminance of no less than 0.2 and no more than 0.3 is input, the signal conversion circuit performs a conversion of the plurality of video signals so that, among the normalized luminances of the plurality of subpixels, the normalized luminance of the red subpixel is the highest.

7. The signal conversion circuit of claim 4, wherein, when the plurality of video signals for the pixel to display a gray color having a normalized luminance of no less than 0.2 and no more than 0.3 is input, the signal conversion circuit performs a conversion of the plurality of video signals so that, among the normalized luminances of the plurality of subpixels, the normalized luminance of the cyan subpixel is the highest.

8. The signal conversion circuit of claim 1, wherein the signal conversion circuit performs a conversion of the plurality of video signals so that the normalized luminance of each of the plurality of subpixels monotonously increases with increase in the normalized luminance of the gray color displayed by the pixel.

9. The signal conversion circuit of claim 1, wherein the signal conversion circuit performs a conversion of the plurality of video signals so that the normalized luminance of at least one of the plurality of subpixels does not monotonously increase with increase in the normalized luminance of the gray color displayed by the pixel.

10. The signal conversion circuit of claim 1, wherein, given a number n of primary colors used for displaying, the signal conversion circuit obtains luminances of (n−3) primary colors among the n primary colors by referring to a look-up table based on the input one of the plurality of video signals, and through a calculation using the luminances of the (n−3) primary colors, calculates the luminances of the other three primary colors among the n primary colors.

11. The signal conversion circuit of claim 10, comprising:
a look-up table memory for storing the look-up table; and
a calculation section for performing the calculation.

12. A multiprimary liquid crystal display device comprising the signal conversion circuit of claim 1 and a liquid crystal display panel to which a multiprimary signal generated by the signal conversion circuit is input.

13. The multiprimary liquid crystal display device of claim 12, wherein,
the liquid crystal display panel includes a first substrate, a second substrate opposing the first substrate, and a vertical-alignment type liquid crystal layer provided between the first substrate and the second substrate, and has the plurality of subpixels; and
in each of the plurality of subpixels, when a predetermined voltage is applied across the liquid crystal layer, liquid crystal molecules contained in the liquid crystal layer are tilted in a plurality of azimuth directions.

14. The multiprimary liquid crystal display device of claim 13, wherein each of the plurality of subpixels has a plurality of regions capable of applying different voltages across the liquid crystal layer therein.

* * * * *